United States Patent
Tanaka et al.

(10) Patent No.: US 6,832,475 B2
(45) Date of Patent: Dec. 21, 2004

(54) COMBUSTION GAS PURIFIER AND INTERNAL COMBUSTION ENGINE

(75) Inventors: Hiroyuki Tanaka, Wako (JP); Seiji Nishimoto, Wako (JP); Haruhiko Komatsu, Wako (JP); Tsuneo Endoh, Wako (JP); Tsuyoshi Baba, Wako (JP); Masashi Shinohara, Wako (JP)

(73) Assignee: Honda Giken Koygo Kabushi Kaisha, Tokyo (JP)

( * ) Notice: Subject to any disclaimer, the term of this patent is extended or adjusted under 35 U.S.C. 154(b) by 0 days.

(21) Appl. No.: 10/181,527
(22) PCT Filed: Jan. 19, 2001
(86) PCT No.: PCT/JP01/00347
§ 371 (c)(1), (2), (4) Date: Nov. 14, 2002
(87) PCT Pub. No.: WO01/53667
PCT Pub. Date: Jul. 26, 2001

(65) Prior Publication Data
US 2003/0145583 A1 Aug. 7, 2003

(30) Foreign Application Priority Data
Jan. 21, 2000 (JP) ...................................... 2000-017782
Oct. 11, 2000 (JP) ...................................... 2000-316840

(51) Int. Cl.$^7$ ................................................. F01N 3/00
(52) U.S. Cl. .......................................... 60/298; 60/320
(58) Field of Search .......................... 60/298, 320, 301; 123/41.68, 41.8

(56) References Cited
U.S. PATENT DOCUMENTS

| | | | | |
|---|---|---|---|---|
| 3,236,044 A | | 2/1966 | Ruge | |
| 4,685,291 A | * | 8/1987 | Ha | 60/286 |
| 5,033,264 A | * | 7/1991 | Cabral | 60/274 |
| 5,085,049 A | * | 2/1992 | Rim et al. | 60/274 |
| 5,398,747 A | * | 3/1995 | Miaoulis | 165/41 |
| 5,603,215 A | * | 2/1997 | Sung et al. | 60/274 |
| 5,857,324 A | * | 1/1999 | Scappatura et al. | 60/274 |
| 5,899,063 A | | 5/1999 | Leistritz | |
| 5,983,628 A | * | 11/1999 | Borroni-Bird et al. | 60/274 |
| 5,987,885 A | * | 11/1999 | Kizer et al. | 60/298 |
| 6,151,891 A | * | 11/2000 | Bennett | 60/298 |
| 6,203,764 B1 | * | 3/2001 | Benson | 422/179 |
| 6,253,548 B1 | * | 7/2001 | Ap et al. | 60/320 |
| 6,422,007 B1 | * | 7/2002 | Hartick | 60/298 |

FOREIGN PATENT DOCUMENTS

| | | |
|---|---|---|
| DE | 197 46 658 A1 | 4/1999 |
| EP | 1 033 481 A1 | 9/2000 |

(List continued on next page.)

*Primary Examiner*—Thomas Denion
*Assistant Examiner*—Diem Tran
(74) *Attorney, Agent, or Firm*—Birch, Stewart, Kolasch & Birch, LLP

(57) ABSTRACT

A small capacity pre-catalytic system (34) is disposed immediately downstream of an exhaust port (18), and a large capacity main catalytic system (35) is disposed immediately downstream of the pre-catalytic system (34). The pre-catalytic system (34) includes finely divided catalyst supports (48), and a third stage heat exchanger (H3) is disposed between these catalyst supports (48) so that a heat transfer tube (49) is bent in a zigzag manner. Fourth stage and fifth stage heat exchangers (H4, H5) are disposed on the upstream side, in the flow of the exhaust gas, of the pre-catalytic system (34), and first and second stage heat exchangers (H1, H2) are disposed on the downstream side, in the flow of the exhaust gas, of the main catalytic system (35). Water is made to flow through the first stage heat exchanger (H1) to the fifth heat exchanger (H5) in a direction opposite to that in which the exhaust gas flows, thereby exchanging heat with the exhaust gas. This allows the catalyst temperature to be actively controlled within the optimal temperature range without degrading the energy efficiency of the entire system.

18 Claims, 29 Drawing Sheets

FOREIGN PATENT DOCUMENTS

| | | |
|---|---|---|
| JP | 59-120710 A | 7/1984 |
| JP | 60-93110 A | 5/1985 |
| JP | 61-85523 A | 5/1986 |
| JP | 63-36619 A | 3/1988 |
| JP | 405044445 * | 2/1993 |
| JP | 5-179942 A | 7/1993 |
| JP | 8-68318 A | 3/1996 |
| JP | 9-272328 A | 10/1997 |
| JP | 11-166410 A | 6/1999 |
| WO | WO 95/20721 A1 | 8/1995 |

* cited by examiner

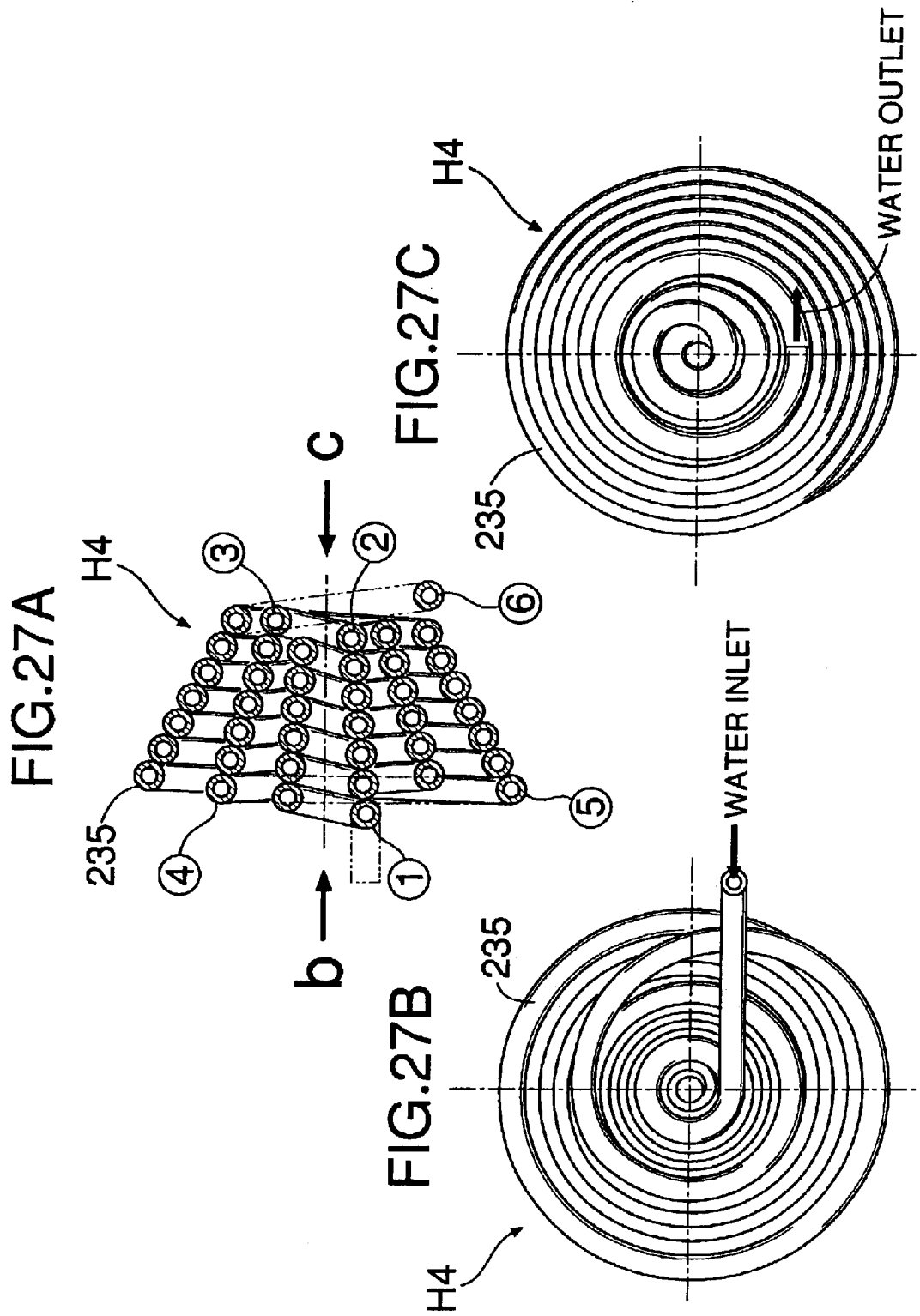

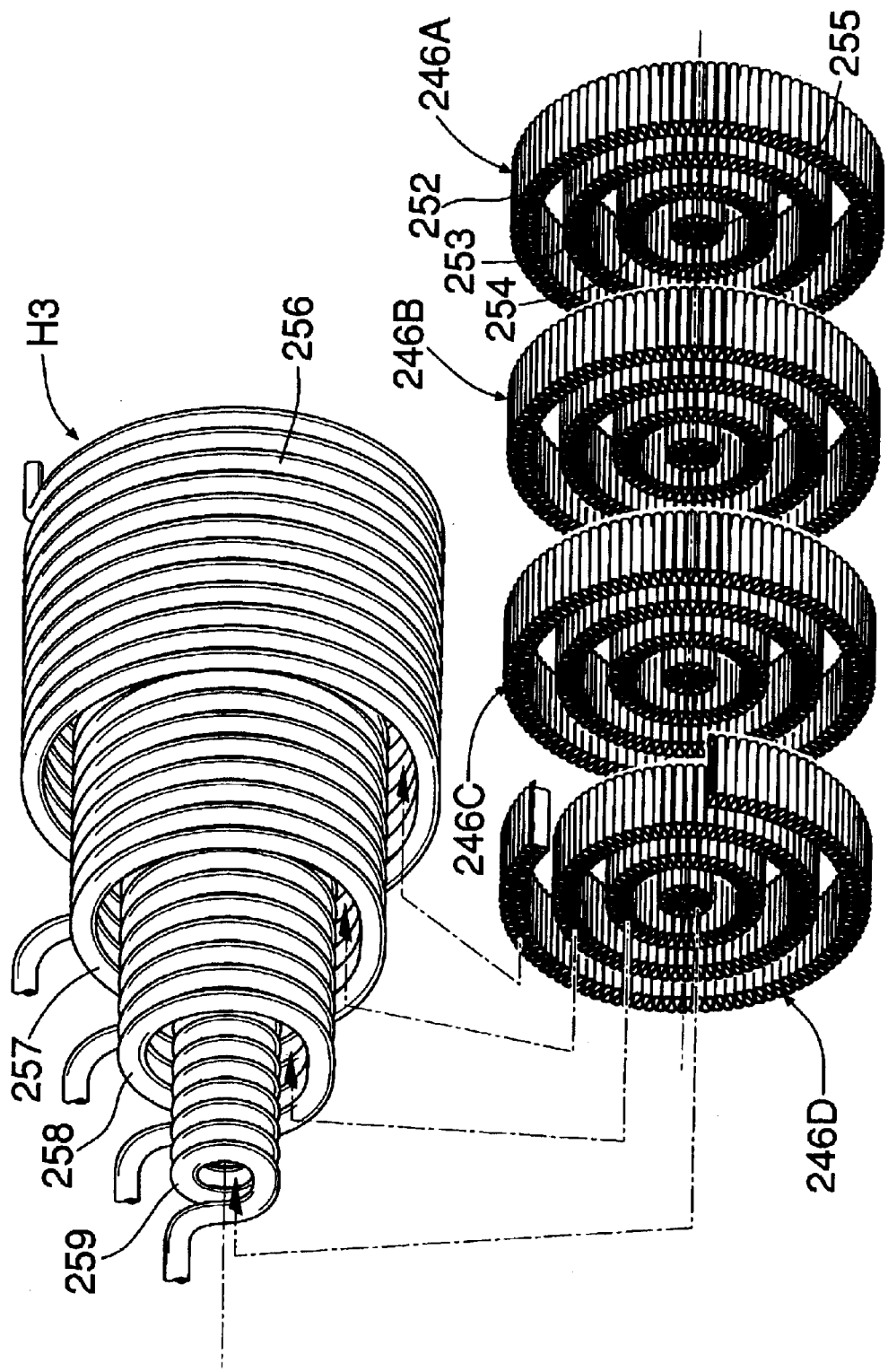

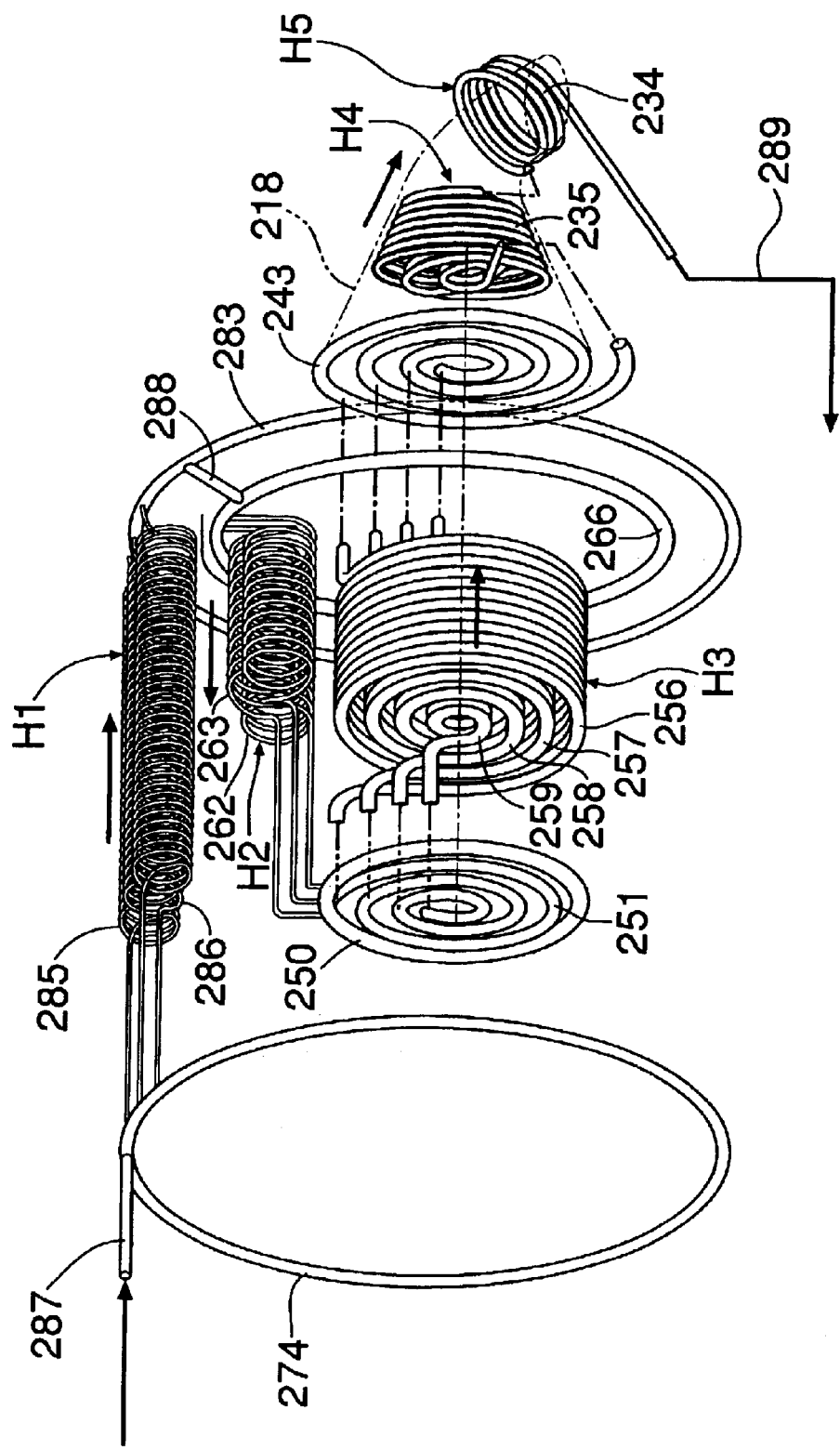

COMBUSTION GAS PURIFIER AND INTERNAL COMBUSTION ENGINE

This application is the national phase under 35 U.S.C. §371 of PCT International Application No. PCT/JP01/00347 which has an International filing date of Jan. 19, 2001, which designated the United States of America.

FIELD OF THE INVENTION

The present invention relates to a combustion gas purification system that purifies, by an oxidation-reduction reaction, harmful components in the combustion gas from a combustion system. Furthermore, the present invention relates to an internal combustion engine that is provided in an exhaust passage thereof with an exhaust gas purification system that purifies the exhaust gas, and a heat exchanger that exchanges heat with the exhaust gas.

BACKGROUND ART

A catalytic system that purifies, by a catalytic reaction, harmful components in the exhaust gas from an internal combustion engine has a structure in which, for example, a platinum system catalyst is supported on a catalyst support, and the catalyst has an optimal temperature for the catalytic reaction. For example, when the catalyst temperature is below the activation temperature and the reactivity is poor, the catalytic system is placed on the upstream side of the exhaust passage where the exhaust gas temperature is high and is thereby heated, or a method is employed in which the catalytic system is heated by an electric heater or the combustion gas generated in a combustion system used exclusively for heating, so as to activate the catalytic reaction. Conversely, when the catalyst temperature becomes higher than its heat resistant temperature, enriching the air/fuel ratio relative to the theoretical air/fuel ratio cools the catalyst by means of the heat of vaporization of surplus fuel, thereby preventing degradation of the catalyst.

Moreover, an arrangement is known from Japanese Patent Application Laid-open No. 60-93110 in which heat exchangers are placed on both the upstream and downstream sides of a catalytic system disposed in an exhaust passage, and the catalyst is maintained at an appropriate temperature by controlling the temperature of the exhaust gas.

In order to allow the catalytic system to function most efficiently, it is of course important to use it within a temperature range that is optimal for the catalytic reaction, but if the catalyst temperature deviates from the temperature that is optimal for the catalytic reaction, it is also important that the catalyst temperature quickly recovers so that it is within the temperature range that is optimal for the catalytic reaction (ref. Table 1). With regard to the deviation from the temperature that is optimal for the catalytic reaction referred to here, there is a case in which the catalyst temperature is lower than the optimal temperature and a case in which it is higher, and for recovering the catalyst temperature so that it is within the temperature range that is optimal for the catalytic reaction, there is a case where the catalyst temperature is increased and a case where it is decreased.

TABLE 1

Examples of temperature range of catalytic reaction

| Operational mode of combustion system | Generally used limit temperature of purification catalyst | |
|---|---|---|
| (application) | Upper limit (° C.) | Lower limit (° C.) |
| Variable output/non-rated operation (movable devices such as automobiles) | 800 to 900 | 250 to 300 |
| Constant output/rated operation (stationary plant machinery) | 500 to 600 | 100 to 200 |

For example, immediately after an internal combustion engine starts, the temperature of the catalytic system itself is close to ambient, and it is therefore necessary to heat the catalytic system as quickly as possible so as to increase the catalyst temperature above the activation temperature.

Among the conventional methods, the method in which the catalytic system is placed in an upstream position of the exhaust passage where the exhaust gas temperature is high places a mechanical limit on how close the catalytic system can be to the upstream end of the exhaust passage because of structural restrictions imposed by a system employing the catalytic system or by the entire system. Furthermore, the method in which the catalytic system at low temperature is heated by an electric heater or combustion gas generated by a combustion system used exclusively for heating requires a special energy source, and there is the problem that the fuel consumption of the entire system increases.

Conversely, since an excessively high catalyst temperature causes degradation of the catalyst, it is necessary to quickly cool the catalyst temperature below the heat resistant temperature. In this case, since the air/fuel ratio is enriched to cool the catalyst by means of the heat of vaporization of surplus fuel, there is the problem of an increase in the fuel consumption.

It should be noted here that in the arrangement described in Japanese Patent Application Laid-open No. 60-93110, it is inherently difficult to actively control the catalyst temperature. That is, in this method, a heat exchanger is disposed on the upstream side of the catalytic system, and there is extra thermal capacity within an exhaust passage through which the exhaust gas, which is a heat source, passes. In other words, when the temperature of the main body of an internal combustion engine is still low immediately after a cold start, the heat of the exhaust gas is consumed by increasing the temperature of the heat exchanger that is further upstream than the catalytic system, and the temperature of the exhaust gas decreases before it increases the temperature of the catalytic system.

Furthermore, when the catalyst is in an over-heated state, heat exchange is first carried out between a low temperature medium and the exhaust gas within the heat exchanger on the upstream side of the catalytic system so as to decrease the temperature of the exhaust gas, and the exhaust gas whose temperature has been decreased by the heat exchange is then supplied to the catalytic system, thereby indirectly suppressing any increase in the temperature of the catalyst. Of course, the heat exchanger on the downstream side of the catalytic system contributes almost nothing to decreasing the catalyst temperature.

As hereinbefore described, since this method indirectly controls the thermal energy that is transferred to the catalyst by controlling the temperature of the exhaust gas, which is a heat source, appropriate control of the catalyst temperature is difficult.

Furthermore, an internal combustion engine that is equipped with an exhaust gas purification system in its exhaust passage is known from Japanese Patent Application Laid-open Nos. 60-93110 and 8-68318, wherein heat exchangers are disposed in the exhaust passage on both the upstream side and the downstream side of the exhaust gas purification system in an attempt to achieve both temperature control capability for the exhaust gas purification system and waste heat recovery capability for the heat exchangers.

Although the exhaust gas purification system generates heat of reaction when removing harmful components from the exhaust gas, since in the above-mentioned conventional arrangement, the exhaust gas purification system and the heat exchangers are not in direct contact, it is difficult to utilize effectively the heat of reaction generated by the exhaust gas purification system in the heat exchangers. Although it is possible to activate the catalyst and protect it from being overheated by controlling the temperature of the exhaust gas purification system by means of the flow rate of an operating medium flowing through the heat exchanger, in the above-mentioned conventional arrangement, since the exhaust gas purification system and the heat exchangers are not in direct contact with each other, it is difficult to control the temperature of the exhaust gas purification system effectively.

DISCLOSURE OF THE INVENTION

The present invention has been carried out in view of the above-mentioned circumstances, and it is a first object of the present invention to provide an exhaust gas purification system that can actively control the catalyst temperature in the optimal temperature range without degrading the energy efficiency of the entire system.

Furthermore, it is a second object of the present invention to enable the best possible performance to be delivered by an exhaust gas purification system and a heat exchanger provided in an exhaust passage of an internal combustion engine.

In order to accomplish the first object, in accordance with the present invention, there is proposed a combustion gas purification system wherein a catalytic system that purifies a combustion gas is disposed in an exhaust passage guiding the combustion gas from a combustion system, and at least one part of the catalytic system is provided with temperature adjustment means for adjusting the temperature thereof.

In accordance with this arrangement, since at least one part of the catalytic system provided in the exhaust passage guiding the combustion gas from the combustion system is provided with the temperature adjustment means for adjusting the temperature thereof, the temperature of the catalytic system can be controlled actively by the temperature adjustment means rather than passively via the temperature of the combustion gas, and the catalyst temperature can thereby be controlled appropriately in the optimal temperature range.

Moreover, in addition to this arrangement, there is proposed a combustion gas purification system wherein the temperature adjustment means is a heat exchanger.

In accordance with this arrangement, since the temperature adjustment means for adjusting the temperature of the catalytic system is a heat exchanger, the thermal energy of the combustion gas and the thermal energy generated by the catalytic reaction can be recovered effectively, thereby enhancing the performance of the heat exchanger.

Furthermore, in addition to this arrangement, there is proposed a combustion gas purification system wherein the catalytic system provided with the temperature adjustment means is positioned on the upstream side of the exhaust passage.

In accordance with this arrangement, since the catalytic system provided with the temperature adjustment means is positioned on the upstream side of the exhaust passage, after starting the combustion system the catalytic system can be quickly heated above the catalyst activation temperature using high temperature combustion gas without providing a special thermal energy source.

Moreover, in addition to this arrangement, there is proposed a combustion gas purification system wherein the temperature adjustment means also controls the temperature of a part of the catalytic system other than the one part of the catalytic system. In accordance with this arrangement, since the temperature adjustment means for the one part of the catalytic system controls the temperature of the other part of the catalytic system, the catalyst temperature of the entire catalytic system can be controlled appropriately within the optimal temperature range.

Furthermore, in addition to this arrangement, there is proposed a combustion gas purification system wherein temperature adjustment means for adjusting the temperature of the combustion gas is provided in the exhaust passage on the upstream side of the catalytic system.

In accordance with this arrangement, since the temperature adjustment means is provided in the exhaust passage on the upstream side of the catalytic system, the temperature of high temperature combustion gas can be adjusted by the temperature adjustment means, thereby preventing the temperature of the catalytic system from exceeding the heat resistant temperature thereof.

Moreover, in addition to this arrangement, there is proposed a combustion gas purification system wherein the temperature adjustment means is a heat exchanger.

In accordance with this arrangement, since the temperature adjustment means provided in the exhaust passage on the upstream side of the catalytic system is a heat exchanger, the thermal energy of high temperature combustion gas can be recovered effectively, thereby enhancing the performance of the heat exchanger.

Furthermore, in addition to this arrangement, there is proposed a combustion gas purification system wherein at least the one part of the catalytic system and the temperature adjustment means are disposed in contact so as to be able to exchange heat with each other.

In accordance with this arrangement, since the catalytic system provided in the exhaust passage of the internal combustion engine makes contact with the temperature adjustment means so that they can exchange heat with each other, control of the temperature of the catalytic system can be carried out effectively by the temperature adjustment means, thereby activating and protecting the catalyst.

Moreover, in addition to this arrangement, there is proposed a combustion gas purification system wherein at least the one part of the catalytic system is formed from a metal and is integrated with the temperature adjustment means at a contact site.

In accordance with this arrangement, since the catalytic system formed from a metal is integrated with the temperature adjustment means, heat exchange between the catalytic system and the temperature adjustment means can be carried out extremely efficiently.

In the above-mentioned first to eighth aspects, an internal combustion engine 1 of an embodiment corresponds to the combustion system, a pre-catalytic system 34 and a main catalytic system 35 of the embodiment correspond to the catalytic system, and a third stage heat exchanger H3, a fourth stage heat exchanger H4, and a fifth stage heat exchanger H5 of the embodiment correspond to the temperature adjustment means.

Furthermore, in order to accomplish the second object, in accordance with the present invention, there is proposed an internal combustion engine including in an exhaust passage an exhaust gas purification system that purifies the exhaust gas and a heat exchanger that exchanges heat with the exhaust gas, characterized in that at least one part of the exhaust gas purification system and at least one part of the heat exchanger are disposed in contact so as to be able to exchange heat with each other.

In accordance with this arrangement, since the exhaust gas purification system and the heat exchanger provided in the exhaust passage of the internal combustion engine are disposed in contact so that they can exchange heat with each other, not only can the heat of reaction generated by the exhaust gas purification system removing harmful components from the exhaust gas be recovered effectively by the heat exchanger, thereby maximizing the waste heat recovery capability, but also the temperature of the exhaust gas purification system can be controlled effectively by the flow rate of an operating medium flowing through the heat exchanger, thereby activating and protecting the catalyst.

Moreover, in addition to this arrangement, there is proposed an internal combustion engine wherein stirring means for stirring the flow of exhaust gas is provided on the upstream side of the section where the exhaust gas purification system and the heat exchanger are in contact.

In accordance with this arrangement, since the stirring means is provided on the upstream side of the section where the exhaust gas purification system and the heat exchanger are in contact, the flow of exhaust gas is stirred and the exhaust gas can be contacted with the exhaust gas purification system and the heat exchanger uniformly and sufficiently, thereby further enhancing the exhaust gas purifying effect and the heat exchange effect.

Furthermore, in addition to this arrangement, there is proposed an internal combustion engine wherein at least the one part of the exhaust gas purification system is formed from a metal and is integrated with at least the one part of the heat exchanger at the contact site.

In accordance with this arrangement, since the exhaust gas purification system formed from a metal is integrated with the heat exchanger, heat exchange between the exhaust gas purification system and the heat exchanger can be carried out extremely efficiently.

In the above-mentioned ninth to eleventh aspects, a first stage metal catalytic system 246A to a fourth stage metal catalytic system 246D of an embodiment correspond to the exhaust gas purification system, a first stage heat exchanger H1 to a fifth stage heat exchanger H5 of the embodiment corresponds to the heat exchanger, and the stirring means corresponds to a guide vane 245 of the embodiment.

BRIEF DESCRIPTION OF THE DRAWINGS

FIG. 1 is a diagram showing the overall arrangement of a drive system employing the Rankine cycle; FIG. 2 is a diagram showing the structure of a power transmission system of the drive system; FIG. 3 is a longitudinal cross section of a cylinder head part of an internal combustion engine; FIG. 4 is a cross section along line 4—4 in FIG. 3; FIG. 5 is a magnified cross section of an essential part in FIG. 3; FIG. 6 is a cross section along line 6—6 in FIG. 5; FIG. 7 is a magnified view of an essential part in FIG. 5; FIG. 8 is a magnified view of an essential part in FIG. 6; FIG. 9A is a diagram showing a heat transfer tube of a fourth stage heat exchanger; FIG. 9B is a view from arrow b in FIG. 9A; FIG. 9C is a view from arrow c in FIG. 9A; FIG. 10 is an exploded perspective view of a pre-catalytic system; FIG. 11 is a schematic diagram showing a water supply route of an evaporator; FIG. 12 is an exploded perspective view of the evaporator; FIG. 13 is a diagram showing the layout of catalytic systems and heat exchangers in an embodiment and comparative embodiments; FIG. 14 is a graph showing the relationship between the exhaust gas temperature and the distance from an exhaust port when cold starting; FIG. 15 is a graph showing the relationship between the exhaust gas temperature and the distance from the exhaust port at high temperature; FIG. 16 is a graph explaining the effect of multiple water supplies; FIG. 17 is a graph showing the relationship between the Reynolds number and the heat transfer performance for steady flow and pulsed flow; and FIG. 18 is a graph showing the relationship between the Reynolds number and the heat transfer performance at different exhaust pressures.

FIGS. 19 to 29 illustrate a second embodiment of the present invention; FIG. 19 is a longitudinal cross section of a cylinder head part of an internal combustion engine; FIG. 20 is a cross section of an essential part in FIG. 19; FIG. 21 is a view from the arrowed line 21—21 in FIG. 20; FIG. 22 is a cross section along line 22—22 in FIG. 20; FIG. 23 is a cross section along line 23—23 in FIG. 20; FIG. 24 is a magnified view of an essential part in FIG. 20; FIG. 25 is a magnified view of part 25 in FIG. 22; FIG. 26 is a cross section along line 26—26 in FIG. 21; FIG. 27A is a diagram showing a heat transfer tube of a fourth stage heat exchanger; FIG. 27B is a view from arrow b in FIG. 27A; FIG. 27C is a view from arrow c in FIG. 27A; FIG. 28 is an exploded perspective view of a metal catalytic system and a third stage heat exchanger; and FIG. 29 is a schematic view showing a water supply route of an evaporator.

BEST MODE FOR CARRYING OUT THE INVENTION

The first embodiment of the present invention is explained below by reference to FIGS. 1 to 18.

Figure 1:
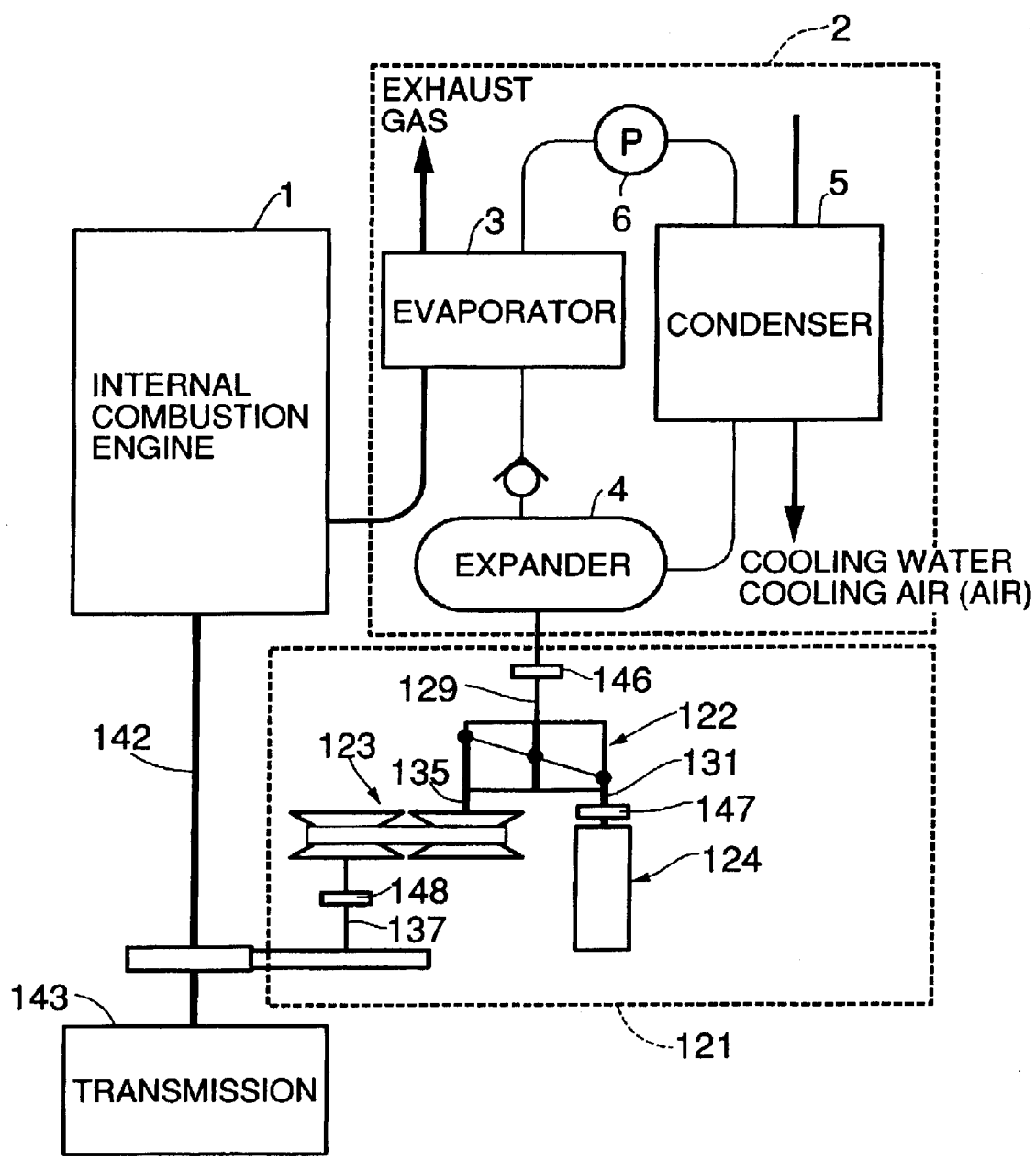
FIGS. 1 to 18 illustrate a first embodiment of the present invention.

In FIG. 1, a waste heat recovery system 2 for an internal combustion engine 1, as a combustion system mounted in an automobile, includes an evaporator 3 that generates vapor having increased temperature and pressure, that is, high-pressure vapor, using, as a heat source, waste heat such as, for example, exhaust gas from the internal combustion engine 1; an expander 4 that generates a shaft output by expansion of the high-pressure vapor; a condenser 5 that liquefies the vapor having decreased temperature and pressure, that is, low-pressure vapor, discharged from the expander 4 after the expansion; and a water supply pump 6 that supplies water from the condenser 5 to the evaporator 3.

Figure 2:
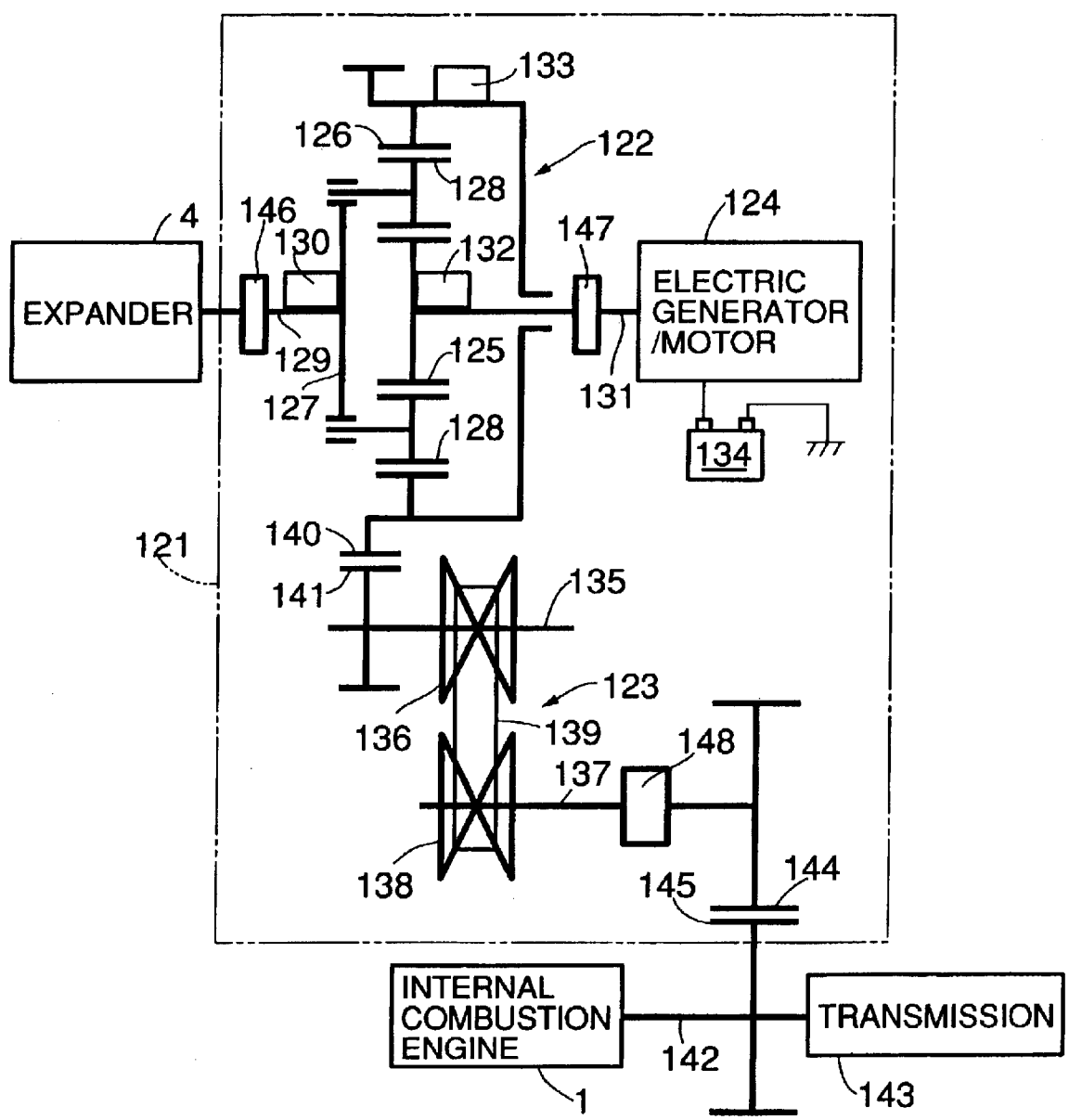
Figure 3:
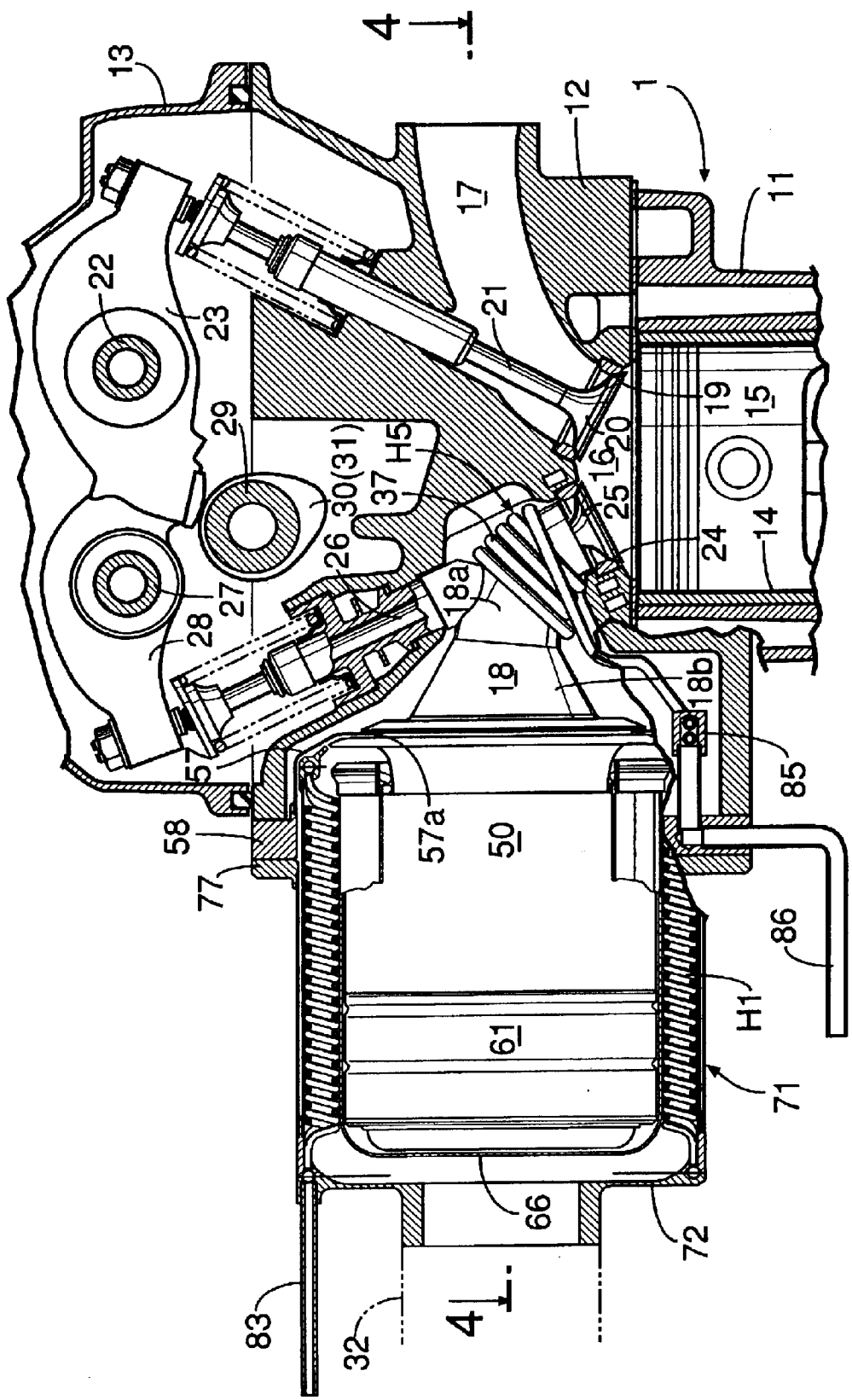

As is clear by referring also to FIG. 2, a power transmission system 121 connected to the waste heat recovery system 2 includes a planetary gear mechanism 122, a belt type continuously variable transmission 123, and an electric generator/motor 124.

The planetary gear mechanism 122 includes a sun gear 125, a ring gear 126, a planetary carrier 127, and a plurality of planetary gears 128 axially supported by the planetary carrier 127 and meshing simultaneously with the sun gear 125 and the ring gear 126. The planetary carrier 127 connected to an output shaft 129 of the expander 4 can engage with a casing, which is not illustrated, via a carrier brake 130. The sun gear 125 connected to an input/output shaft 131 of the electric generator/motor 124 can engage with the casing, which is not illustrated, via a sun gear brake 132. The ring gear 126 can engage with the casing, which is not illustrated, via a ring gear brake 133. Each of the carrier brake 130, the sun gear brake 132, and the ring gear brake 133 is formed from a hydraulic brake or an electromagnetic brake.

The electric generator/motor 124 is connected to a battery 134 that can be charged and discharged. The electric generator/motor 124 charges the battery 134 when it is driven by the shaft output of the expander 4 or the internal combustion engine 1 so as to function as an electric generator, and it assists the drive by the internal combustion engine 1 of driven wheels or starts the internal combustion engine 1 when it functions as a motor powered by the battery 134.

The belt type continuously variable transmission 123 includes a drive pulley 136 provided on an input shaft 135, a follower pulley 138 provided on an output shaft 137, and an endless belt 139 wrapped around the two pulleys 136, 138. The groove width of the drive pulley 136 and the groove width of the follower pulley 138 are individually variable by hydraulic control or electric control; increasing the groove width of the drive pulley 136 and decreasing the groove width of the follower pulley 138 continuously change the gear ratio to the LOW side, and decreasing the groove width of the drive pulley 136 and increasing the groove width of the follower pulley 138 continuously changes the gear ratio to the TOP side.

A drive gear 140 provided on the ring gear 126 of the planetary gear mechanism 122 meshes with a driven gear 141 provided on the input shaft 135 of the belt type continuously variable transmission 123. The shaft output of the internal combustion engine 1 is transmitted to a transmission 143 via an output shaft 142, and the output from the transmission 143 is transmitted to driven wheels, which are not illustrated. A drive gear 144 provided on the output shaft 137 of the belt type continuously variable transmission 123 meshes with a driven gear 145 provided on the output shaft 142 of the internal combustion engine 1.

Torque limiters 146, 147 are provided on the output shaft 129 of the expander 4 and the input/output shaft 131 of the electric generator/motor 124 respectively. The torque limiters 146, 147 slip when a torque equal to or greater than a predetermined value is applied to the expander 4 or the electric generator/motor 124, thereby preventing an excess load being generated. The torque limiters 146, 147 can be replaced with clutches that disengage when an overload torque that is equal to or greater than a predetermined value is generated. A clutch 148 is provided on the output shaft 137 of the belt type continuously variable transmission 123. The clutch 148 is for preventing an overload from being applied to the expander 4 due to the driving force transmitted back from the internal combustion engine 1 or the driven wheels, and it provides a connection between the internal combustion engine 1 and the expander 4 when it is engaged, and disconnects the internal combustion engine 1 from the expander 4 when it is disengaged.

When the sun gear 125 is fixed by engaging the sun gear brake 132 of the planetary gear mechanism 122, each of the planetary carrier 127 and the ring gear 126 becomes an input element or an output element; a driving force input from the expander 4 into the planetary carrier 127 is output to the ring gear 126 and is then transmitted therefrom to the output shaft 142 of the internal combustion engine 1 via the drive gear 140, the driven gear 141, the belt type continuously variable transmission 123, the drive gear 144, and the driven gear 145, and the shaft output of the expander 4 can thereby assist the shaft output of the internal combustion engine 1. On the other hand, if a driving force is transmitted via the reverse of the above route when starting the expander 4, the shaft output of the internal combustion engine 1 can smoothly start the expander 4.

When the ring gear 126 is fixed by engaging the ring gear brake 133 of the planetary gear mechanism 122, each of the expander 4 or the electric generator/motor 124 becomes an input element and an output element; a driving force input from the expander 4 into the planetary carrier 127 is output to the electric generator/motor 124 via the sun gear 125, thus allowing the electric generator/motor 124 to function as an electric generator, and thereby charging the battery 134. On the other hand, if a driving force is transmitted via the reverse of the above route when starting the expander 4, the shaft output of the electric generator/motor 124 functioning as a motor can smoothly start the expander 4.

When the planetary carrier 127 is fixed by engaging the carrier brake 130 of the planetary gear mechanism 122, each of the sun gear 125 and the ring gear 126 becomes an input element or an output element. A driving force input into the sun gear 125 from the electric generator/motor 124 functioning as a motor is therefore output from the ring gear 126, is transmitted therefrom to the output shaft 142 of the internal combustion engine 1 via the drive gear 140, the driven gear 141, the belt type continuously variable transmission 123, the drive gear 144, and the driven gear 145, and assists the shaft output of the internal combustion engine 1 or starts the internal combustion engine 1. On the other hand, transmitting the shaft output of the internal combustion engine 1 to the electric generator/motor 124 via the reverse of the above route allows the electric generator/motor 124 to function as an electric generator, thereby charging the battery 134.

The structure of the evaporator 3 of the waste heat recovery system 2 for the internal combustion engine 1 is now explained in detail by reference to FIGS. 3 to 12.

As shown in FIGS. 3 to 8, the in-line three cylinder internal combustion engine 1 includes a cylinder block 11, a cylinder head 12, and a head cover 13, which are laminated one on another, and pistons 15 are slidably fitted in three cylinder bores 14 formed in the cylinder block 11. Among intake ports 17 and exhaust ports 18 communicating with three corresponding combustion chambers 16 formed in the cylinder head 12, the intake ports 17 are bored within the cylinder head 12 as is conventional, but the exhaust ports 18 are formed from a separate member and joined to the cylinder head 12.

The upper end of a stem 21 of an intake valve 20 that opens and closes an intake valve hole 19 abuts against one end of an intake rocker arm 23 pivotably supported on an intake rocker arm shaft 22, and the upper end of a stem 26 of an exhaust valve 25 that opens and closes an exhaust valve hole 24 abuts against one end of an exhaust rocker arm 28 pivotably supported on an exhaust rocker arm shaft 27. The other end of the intake rocker arm 23 and the other end of the exhaust rocker arm 28 abut against an intake cam 30 and an exhaust cam 31 respectively provided on a camshaft 29 rotating in association with a crankshaft, which is not illustrated, thereby making the intake valve 20 and the exhaust valve 25 open and close.

Provided on the side face of the cylinder head 12 on the exhaust side is the evaporator 3 that generates vapor having increased temperature and pressure, that is, high-pressure vapor, using the exhaust gas of the internal combustion engine 1 as a heat source. The evaporator 3 includes an exhaust passage 33 having the three exhaust ports 18 as the base end and extending to an exhaust pipe 32, three pre-catalytic systems 34 and three main catalytic systems 35 disposed within the exhaust passage 33, and heat exchangers H1 to H5 carrying out heat exchange with the exhaust gas flowing in the exhaust passage 33.

Each of the exhaust ports 18 is formed from a uniform diameter part 18a positioned on the upstream side of the flow of the exhaust gas, and having a substantially constant diameter, and an increasing diameter part 18b provided so as to be connected to the downstream side of the uniform diameter part 18a and having a diameter that increases in a trumpet shape; the fifth stage heat exchanger H5 is provided around the outer periphery of the uniform diameter part 18a, and the fourth stage heat exchanger H4 is provided within the increasing diameter part 18b. The fifth stage heat exchanger H5 is formed from about 5 turns of a single heat transfer tube 37 wound around the outer periphery of the uniform diameter part 18a. The fourth stage heat exchanger H4 is formed from multiple windings of a single heat transfer tube 38 that is housed within the increasing diameter part 18b, and the heat transfer tube 37 of the fifth stage heat exchanger H5 runs through an opening (not illustrated) formed in the exhaust port 18 and is continuous to the heat transfer tube 38 of the fourth stage heat exchanger H4.

As is clear from reference to FIGS. 9A to 9C, the heat transfer tube 38 of the fourth stage heat exchanger H4 is wound in a triple coil shape that is tapered so as to follow the shape of the interior of the increasing diameter part 18b of the exhaust port 18; the coil in the inner layer is wound from the rear (the left-hand side in the figure) toward the front (the right-hand side in the figure) while decreasing in diameter and is folded back at the front end; this is followed by the coil in the middle layer, which is wound from the front toward the rear while increasing in diameter and is folded back at the rear end; and this is followed by the coil in the outer layer, which is wound from the rear toward the front while decreasing in diameter. A water inlet shown in FIG. 9B is connected to the third stage heat exchanger H3, which is on the upstream side and will be described later, and a water outlet shown in FIG. 9C is connected to the heat transfer tube 37 of the fifth stage heat exchanger H5, which is on the downstream side. The circled numerals to shown in FIG. 9A show the route via which water flows through the heat transfer tube 38.

In addition, winding the heat transfer tube 38 of the fourth stage heat exchanger H4 in the triple coil shape that is tapered so as to follow the shape of the interior of the increasing diameter part 18b of the exhaust port 18 makes it possible to have a rectifying effect on the exhaust gas that flows through the increasing diameter part 18b, thereby contributing to a reduction in the circulation resistance.

Figure 7:
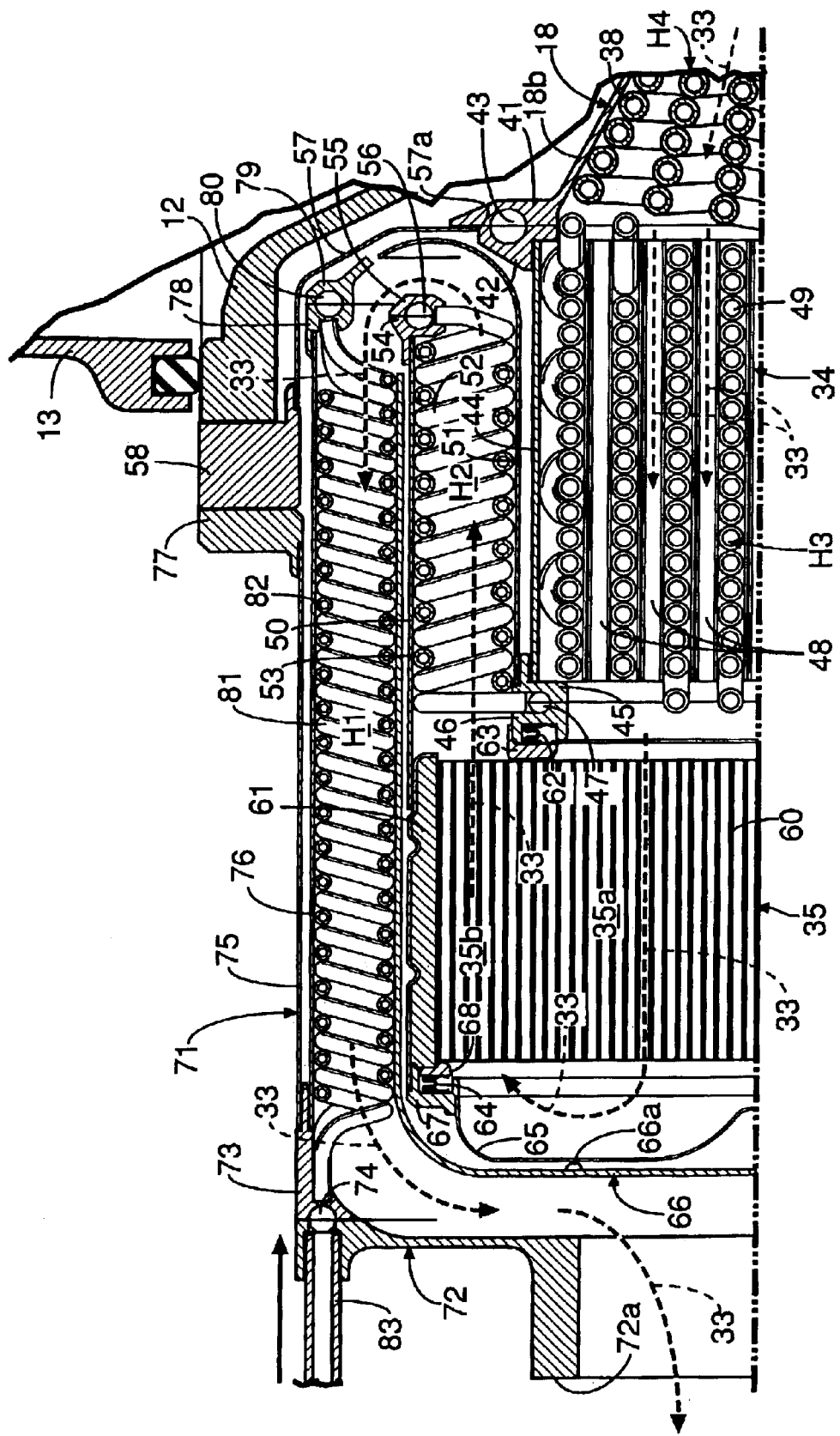
Figure 8:
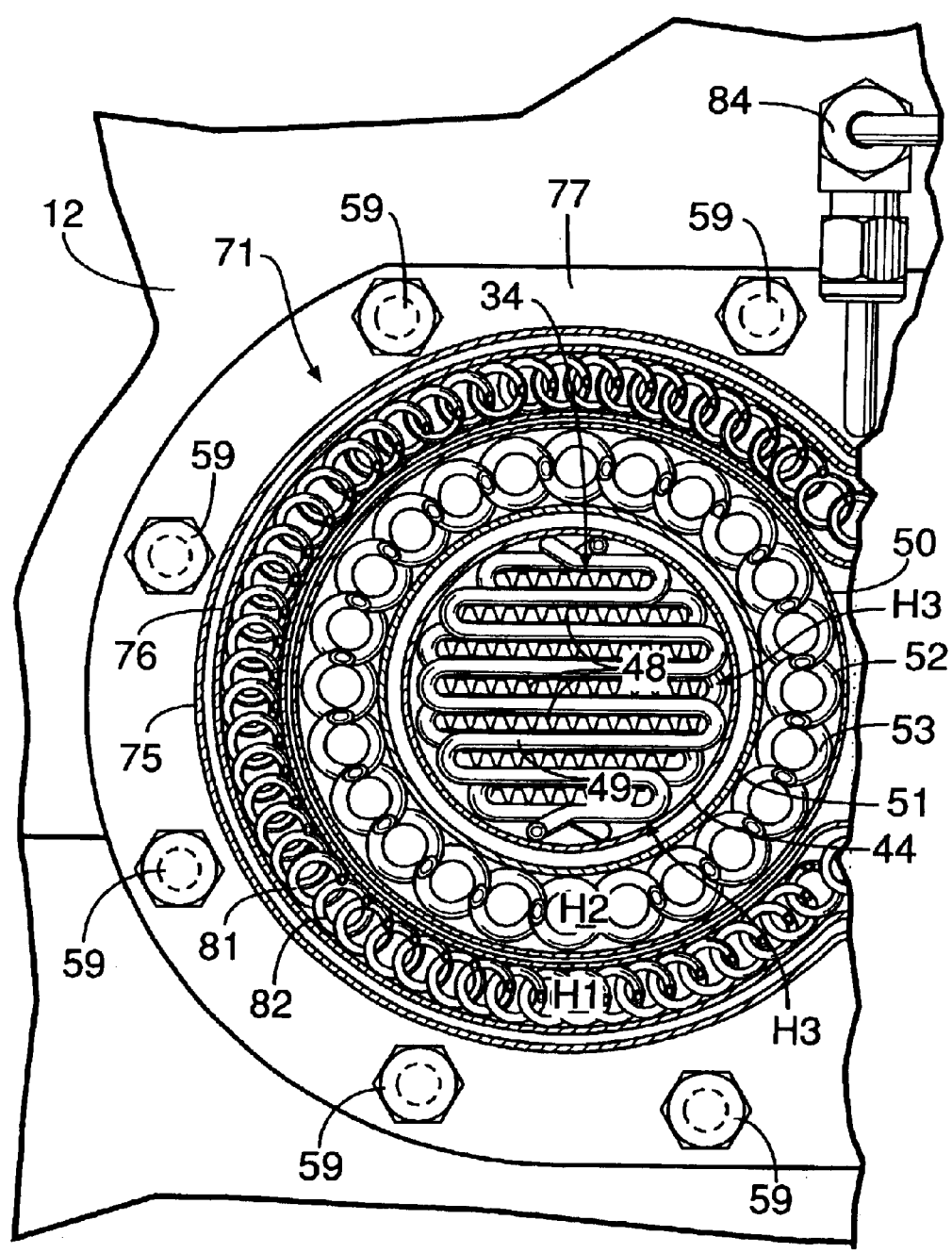
Figure 9:
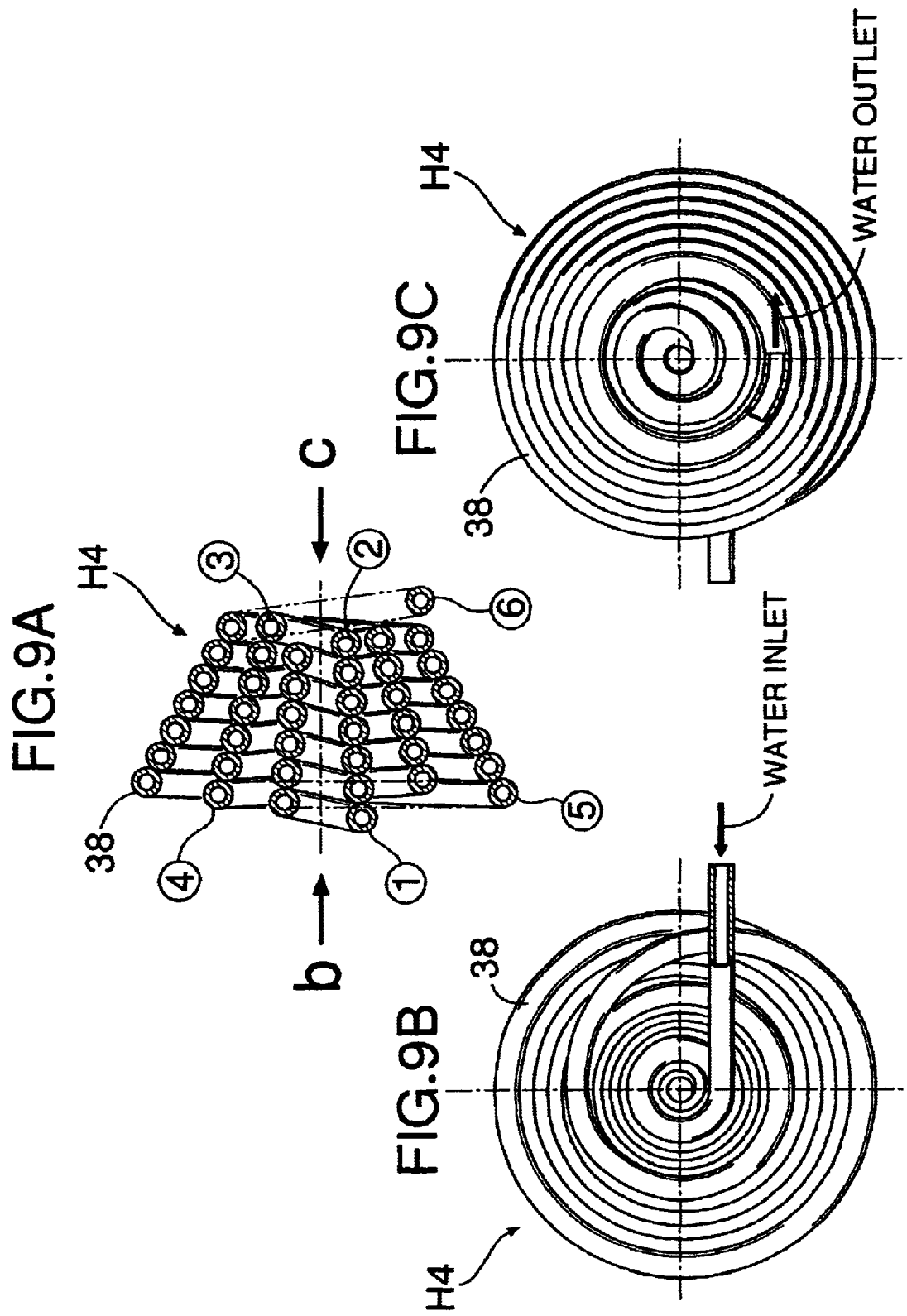
Figure 10:
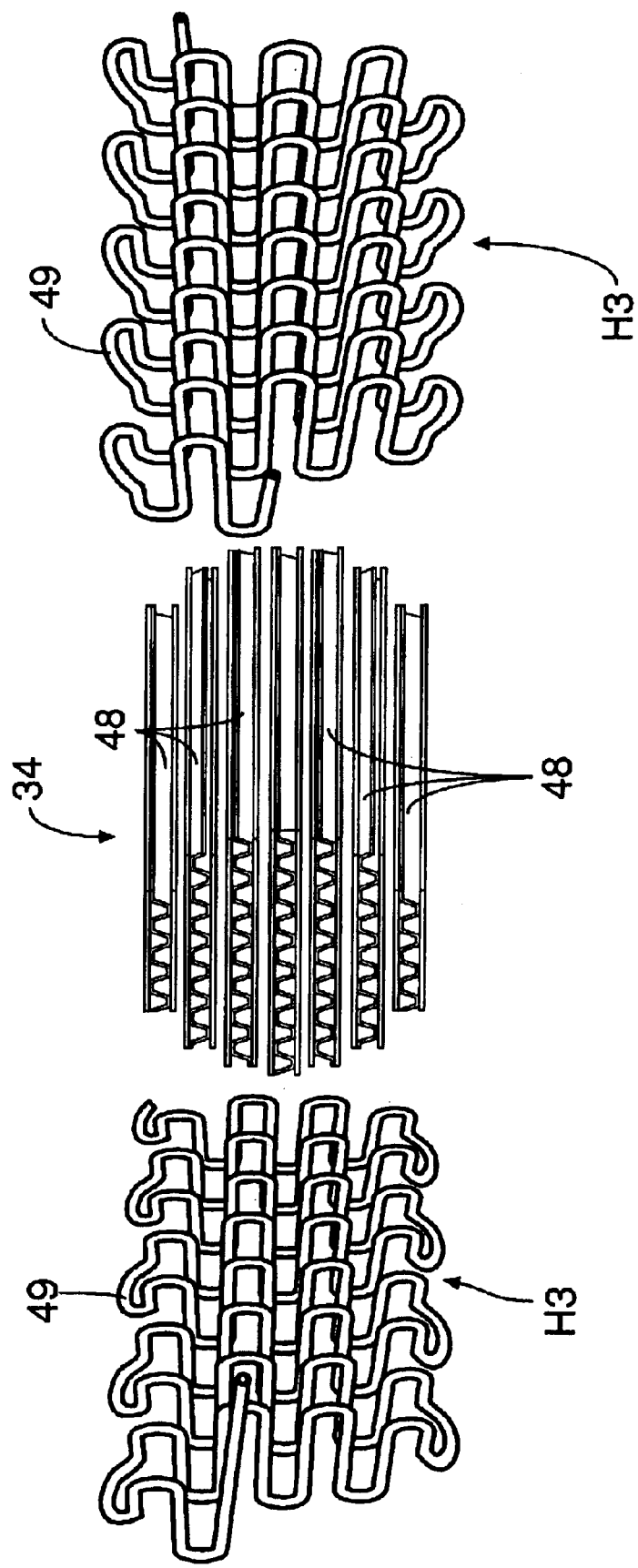

As is most clearly shown in FIGS. 7 and 8, an annular distribution passage forming member 41 is integrally formed on the rear end of the increasing diameter part 18b of the exhaust port 18, and by joining a separate annular distribution passage forming member 42 to the rear face of the distribution passage forming member 41, a third circular distribution passage 43 is formed between the two distribution passage forming members 41, 42. The upstream end of the heat transfer tube 38 of the fourth stage heat exchanger H4 is connected to the third circular distribution passage 43.

The front end of a cylindrical case 44 covering the outer periphery of the pre-catalytic system 34 is joined to the distribution passage forming member 42, and a second circular distribution passage 47 is formed between two annular distribution passage forming members 45, 46, which are superimposed one on another and joined to the rear end of the cylindrical case 44. The pre-catalytic system 34 and the third stage heat exchanger H3 are disposed within the cylindrical case 44.

The pre-catalytic system 34 includes seven sheets of catalyst support 48 formed in honeycomb plates from a metal, on the surface of which is supported a known exhaust gas purification catalyst. The third stage heat exchanger H3, which is disposed within the cylindrical case 44 so as to surround the seven sheets of catalyst support 48, is formed from two bent heat transfer tubes 49, 49 (see FIG. 10). Each of the heat transfer tubes 49, 49 is bent in a zigzag within a circular plane, then moves to the next plane that is separated therefrom by one pitch in the axial direction and is bent in the same zigzag shape, this being repeated to give a cylindrical outer shape having a plurality of pitches. The seven sheets of catalyst support 48 are housed within the internal space formed by interlacing together the two heat transfer tubes 49, 49. Here, the two heat transfer tubes 49, 49 are integrated so as to be in intimate contact with the surface of the seven sheets of catalyst support 48. The upstream ends of the two heat transfer tubes 49, 49 are connected to the second circular distribution passage 47 formed between the distribution passage forming members 45, 46, and the downstream ends thereof are connected to the third circular distribution passage 43 formed between the distribution passage forming members 41, 42.

Two cylindrical cases 50, 51 are coaxially disposed outside, in the radial direction of the cylindrical case 44 of the pre-catalytic system 34, and the second stage heat exchanger H2 is disposed in an annular form between the two cylindrical cases 50, 51. The second stage heat exchanger H2 is formed from a large number of heat transfer tubes 52 wound in a coiled shape in one direction and a large number of heat transfer tubes 53 wound in a coiled shape in the other direction, the tubes 52, 53 being disposed alternately so that parts thereof are meshed together, thereby increasing the placement density of the heat transfer tubes 52, 53 within the space. The outer periphery of the pre-catalytic system 34 is thus surrounded by the heat transfer tubes 52, 53.

A first circular distribution passage 56 is formed between a distribution passage forming member 54 fixed to the front end of the cylindrical case 50 on the outer side and a distribution passage forming member 55 joined to the front face of the distribution passage forming member 54. The upstream ends of the heat transfer tubes 52, 53 are connected to the first circular distribution passage 56, and the downstream ends of the heat transfer tubes 52, 53 are connected to the second circular distribution passage 47.

The three pre-catalytic systems 34 are combined into one by a press-formed metal plate mounting plate 57 and fixed to the cylinder head 12. Three openings 57a are formed in the mounting plate 57, and the distribution passage forming member 41 of each of the increasing diameter parts 18b of the three exhaust ports 18 is integrally fixed to the corresponding opening 57a. An oval-shaped flange 58 fixed to the outer periphery of the mounting plate 57 is fixed to the cylinder head 12 by sixteen bolts 59.

The three main catalytic systems 35 are disposed to the rear of the three pre-catalytic systems 34. The main catalytic systems 35 are formed by supporting a catalyst on the surface of catalyst supports 60 having a honeycomb structure formed in an overall cylindrical shape, and thick ring members 61 are fitted around the outer peripheries thereof. The main catalytic systems 35 have a diameter larger than that of the pre-catalytic systems 34, and the main catalytic systems 35 are divided into inner layer parts 35a having the same diameter as that of the pre-catalytic systems 34 and outer layer parts 35b that project outside the outer peripheries of the pre-catalytic systems 34. In order to seal opposing parts of the pre-catalytic systems 34 and the main catalytic systems 35, seal members 63 supported on the rear face of the distribution passage forming member 46 via springs 62 resiliently abut against the front faces of the main catalytic systems 35. End caps 65 are supported, via springs 64, on the rear ends of the ring members 61 on the outer peripheries of the main catalytic systems 35. The rear faces of the three end caps 65 abut against projections 66a provided on the front face of an inner wall member 66, which will be described later, and are pushed forward.

The outsides of the three pre-catalytic systems 34 and the three main catalytic systems 35 are covered with a detachable common cover 71. The cover 71 includes a plate-shaped distribution passage forming member 72 having a mounting hole 72a for the exhaust pipe 32 in its center and a triple ring-shaped distribution passage forming member 73 joined to the front face of the distribution passage forming member 72, and a first triple ring-shaped distribution passage 74 is formed between the two distribution passage forming members 72, 73. A tubular member 75 positioned radially outside and a tubular member 76 positioned radially inside extend forward, with a slight gap therebetween, from the triple ring-shaped distribution passage forming member 73, and an oval flange 77 provided on the front end of the outer tubular member 75 is superimposed on the flange 58 and they are tightened together by the bolts 59.

A triple ring-shaped distribution passage forming member 78 is fixed to the front end of the inner tubular member 76, and a second triple ring-shaped distribution passage 80 is formed by joining, to the front face of the distribution passage forming member 78, a distribution passage forming member 79 of the substantially same shape. The first triple ring-shaped distribution passage 74 and the second triple ring-shaped distribution passage 80 have an identical shape and face each other in the front to rear direction. The cup-shaped inner wall member 66 is housed within the cover 71, and the first stage heat exchanger H1 is disposed between the outer periphery of the inner wall member 66 and the inner periphery of the inner tubular member 76.

The first stage heat exchanger H1 has a similar structure to that of the second stage heat exchangers H2; a large number of heat transfer tubes 81 wound in a coiled shape in one direction and a large number of heat transfer tubes 82 wound in a coiled shape in the other direction are disposed alternately so that parts thereof are meshed together, and these heat transfer tubes 81, 82 surround the outer peripheries of the second stage heat exchangers H2 and the outer peripheries of the main catalytic systems 35. The upstream ends of the heat transfer tubes 81, 82 are connected to the first triple ring-shaped distribution passage 74, and the downstream ends thereof are connected to the second triple ring-shaped distribution passage 80.

The materials for the heat transfer tubes 37 of the fifth stage heat exchangers H5, the heat transfer tubes 38 of the fourth stage heat exchangers H4, the heat transfer tubes 49 of the third stage heat exchangers H3, the heat transfer tubes 52, 53 of the second stage heat exchangers H2, and the heat transfer tubes 81, 82 of the first stage heat exchanger H1 are preferably heat-resistant stainless steel (austenite type such as SUS 316L or SUS 310S, ferrite type such as SUS 430 or SUS 444) or a nickel-based heat-resistant alloy. Joining of the heat transfer tubes is preferably carried out by brazing or mechanical restraint.

Furthermore, with regard to the catalyst supports 48 for the pre-catalytic systems 34, heat-resistant stainless steel (e.g., 20% by weight Cr-5% by weight Al ferrite type stainless steel) or a nickel-based heat-resistant alloy foil (thickness 0.1 mm or below) is preferable, and with regard to the catalyst supports 60 for the main catalytic systems 35, cordylite is preferable.

Figure 11:
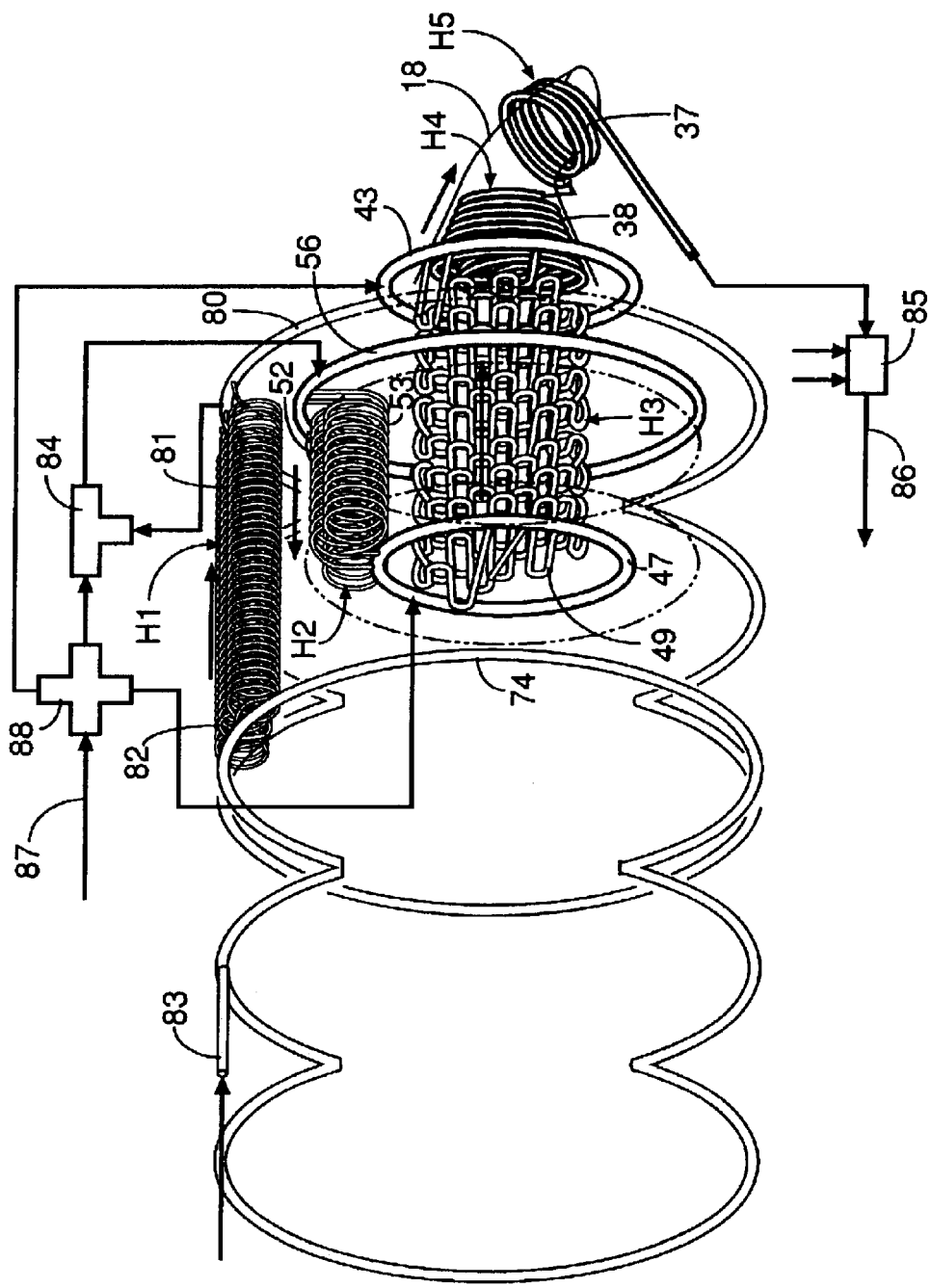

As is clear from reference to FIG. 11, a water inlet 83, into which water that is a source of high pressure vapor is supplied, is provided in a central part of the first triple ring-shaped distribution passage 74, which communicates with the second triple ring-shaped distribution passage 80 via a large number of the heat transfer tubes 81, 82 of the first stage heat exchanger H1 disposed so as to surround the outer peripheries of the three main catalytic systems 35, and the second triple ring-shaped distribution passage 80 communicates with the three first circular distribution passages 56 via two detachable couplings 84.

The three first circular distribution passages 56 communicate with the three second circular distribution passages 47 via the heat transfer tubes 52, 53 of the second stage heat exchangers H2 disposed so as to surround the outer peripheries of the three pre-catalytic systems 34, and each of these three second circular distribution passages 47 communicates with the corresponding one of the three third circular distribution passages 43 via two of the heat transfer tubes 49 of the third stage heat exchangers H3 disposed within the three pre-catalytic systems 34. Each of the three third circular distribution passages 43 continues through one of the heat transfer tubes 38 of the fourth stage heat exchangers H4 that pass through the interiors of the three exhaust ports 18 and one of the heat transfer tubes 37 of the fifth stage heat exchangers H5 that pass around the exteriors of the three exhaust ports 18, and they are then combined together by a coupling 85 and supplied to the expander 4 in a subsequent stage from a water outlet 86.

Water that has been supplied from a midstream water inlet 87 branches in three directions in a distributor 88, a part thereof is supplied midstream to the three first circular distribution passages 56 via the couplings 84, a part thereof is supplied midstream to the three second circular distribution passages 47, and a part thereof is supplied midstream to the three third circular distribution passages 43.

In this way, while the water that is supplied from the water inlet 83 travels to the water outlet 86 via the first stage heat exchanger H1→the second stage heat exchangers H2→the third stage heat exchangers H3→the fourth stage heat exchangers H4→the fifth stage heat exchangers H5, it exchanges heat with exhaust gas that comes out of the internal combustion engine 1 and flows in a direction opposite to that in which the water flows, the water becoming vapor.

That is, while passing through the uniform diameter parts 18a of the three exhaust ports 18, the exhaust gas coming out of the internal combustion engine 1 exchanges heat with the fifth stage heat exchangers H5 formed from the heat transfer tubes 37 wound around the outer peripheries of the uniform diameter parts 18a. The exhaust gas that has flowed from the uniform diameter parts 18a of the exhaust ports 18 into the increasing diameter parts 18b exchanges heat by direct contact with the fourth stage heat exchangers H4 formed from the heat transfer tubes 38 wound in a triple coil shape and housed within the increasing diameter parts 18b. The exhaust gas passes from the exhaust ports 18 through the interior of the seven catalyst supports 48 of each of the three pre-catalytic systems 34 to purify its harmful components and, at this point, exchanges heat with the third stage heat exchangers H3 formed from the heat transfer tubes 49 surrounding the peripheries of the catalyst supports 48.

The exhaust gas that has passed through the three pre-catalytic systems 34 passes through the inner layer parts 35a of the three main catalytic systems 35 from the front to the rear, is then blocked by the end caps 65 and makes a U-turn, and passes through the outer layer parts 35b of the main catalytic systems 35 from the rear to the front; during this stage, harmful components in the exhaust gas are purified by the main catalytic systems 35. The exhaust gas coming out of the main catalytic systems 35 exchanges heat while flowing, from the rear to the front, through the second stage heat exchangers H2 formed from the heat transfer tubes 52, 53 disposed between the pairs of cylindrical cases 50, 51, then changes direction through 180°, exchanges heat while flowing, from the front to the rear, through the first stage heat exchanger H1 formed from the heat transfer tubes 81, 82 disposed between the tubular member 76 and the inner wall member 66, and is finally discharged into the exhaust pipe 32 through the mounting hole 72a of the distribution passage forming member 72.

Figure 12:
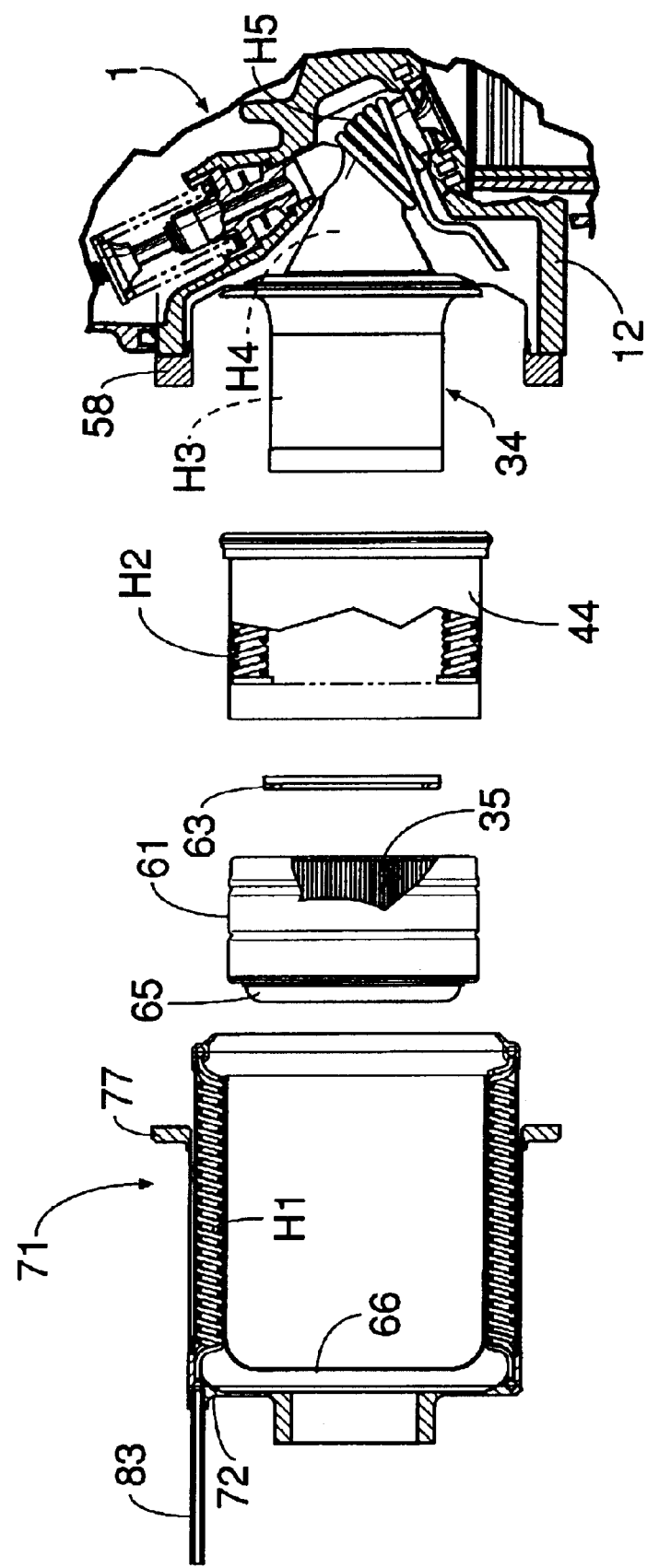

The procedure for assembling the evaporator 3 having the above-mentioned structure is explained mainly by reference to FIG. 12.

Firstly, mounted in the cylinder head 12 is a sub-assembly integrally formed from the three exhaust ports 18, to which the fourth stage heat exchangers H4 and the fifth stage heat exchangers H5 are preassembled, and the three pre-catalytic systems 34, to which the second stage heat exchangers H2 and the third stage heat exchangers H3 are preassembled. That is, the distribution passage forming members 41 provided in the three exhaust ports 18 are integrally fixed to the three openings 57a of the plate-shaped mounting plate 57, and the oval-shaped flange 58 fixed to the outer periphery of the mounting plate 57 is positioned on the cylinder head 12.

Subsequently, the three main catalytic systems 35 are brought up to the three pre-catalytic systems 34 from the rear, and the outer peripheries at the front end of the ring members 61 on the outer peripheries of the main catalytic systems 35 are fitted to the outer peripheries at the rear end of the cylindrical cases 50 of the second stage heat exchangers H2. At this point, the seal members 63 supported on the rear faces of the distribution passage forming members 46 via the springs 62 resiliently abut against the front faces of the main catalytic systems 35 (see FIG. 4).

Subsequently, the cover 71 is moved forward so as to cover the outer peripheries of the three main catalytic systems 35 and the three second stage heat exchangers H2 with the triple ring-shaped first stage heat exchanger H1 in which three circles are staggered in the lateral direction and superimposed one on another, and the flange 77 provided on the tubular member 75 of the cover 71 is superimposed on the rear face of the flange 58 of the mounting plate 57 and joined to the cylinder head 12 by the sixteen bolts 59. At this point, the projections 66a of the inner wall member 66 within the cover 71 push the end caps 65 of the main catalytic systems 35 forward so as to compress the springs 64 between spring seats 67 provided on the outer peripheries of the end caps 65 and spring seats 68 provided on the rear ends of the ring members 61 on the outer peripheries of the main catalytic systems 35 (see FIG. 4).

As hereinbefore described, since the assembly is carried out so as to give a slight gap in the radial direction between an inner layer part including the pre-catalytic systems 34 and the main catalytic systems 35, and the cover 71, which is an outer layer part covering the outer peripheries thereof, thermal expansion thereof in the radial direction can be absorbed. Furthermore, since the main catalytic systems 35 are resiliently retained by the springs 62 and 64 between the rear faces of the pre-catalytic systems 34 and the front face of the inner wall member 66 of the cover 71, thermal expansion of the pre-catalytic systems 34 and the main catalytic systems 35 in the axial direction can be absorbed.

Finally, the three first circular distribution passages 56 are each connected to the second triple ring-shaped distribution passage 80 at the front end of the cover 71 via the couplings 84, and the three heat transfer tubes 37 of the fifth stage heat exchangers H5 extending from the three exhaust ports 18 are combined by the coupling 85 to thereby complete the assembly of the evaporator 3.

Figure 13:
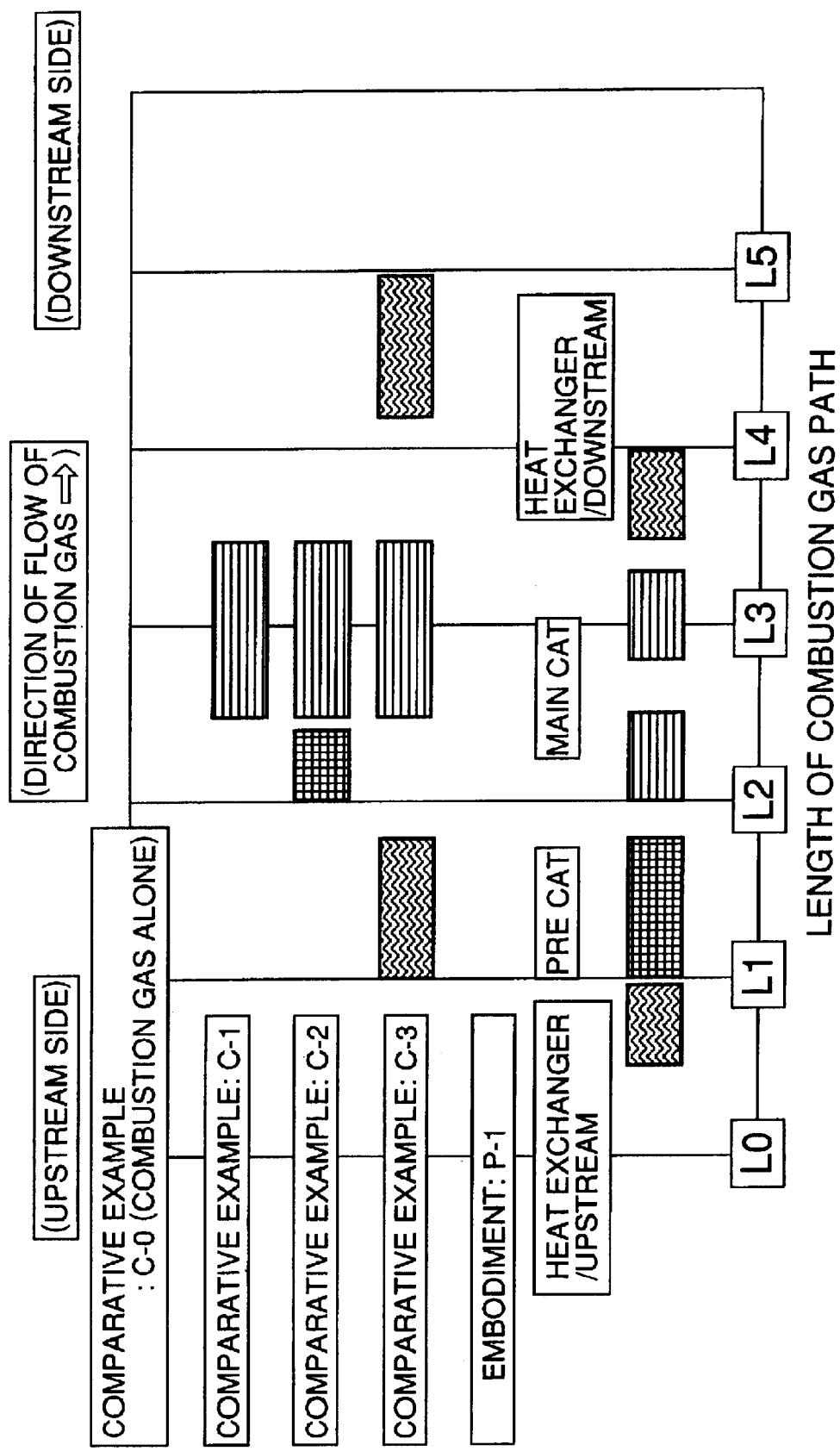

It should be noted here that as shown in FIG. 13, in Present Embodiment P-1, a catalytic system for purifying an exhaust gas is divided into the pre-catalytic systems 34 on the upstream side and the main catalytic systems 35 on the downstream side, the fourth stage heat exchangers H4 and the fifth stage heat exchangers H5 are disposed on the upstream side of the flow of the exhaust gas, of the pre-catalytic systems 34, and the first stage heat exchanger H1 and the second stage heat exchangers H2 are disposed on the downstream side of the flow of the exhaust gas, of the main catalytic systems 35. As hereinbefore described, the third stage heat exchangers H3 are housed within the pre-catalytic systems 34.

On the other hand, Comparative Example C-0 includes neither a catalytic system nor a heat exchanger, Comparative Example C-1 includes only a main catalytic system, Comparative Example C-2 includes a main catalytic system as the stage following a pre-catalytic system, and Comparative Example C-3 includes heat exchangers as both the stage prior to and the stage following a main catalytic system.

Figure 14:
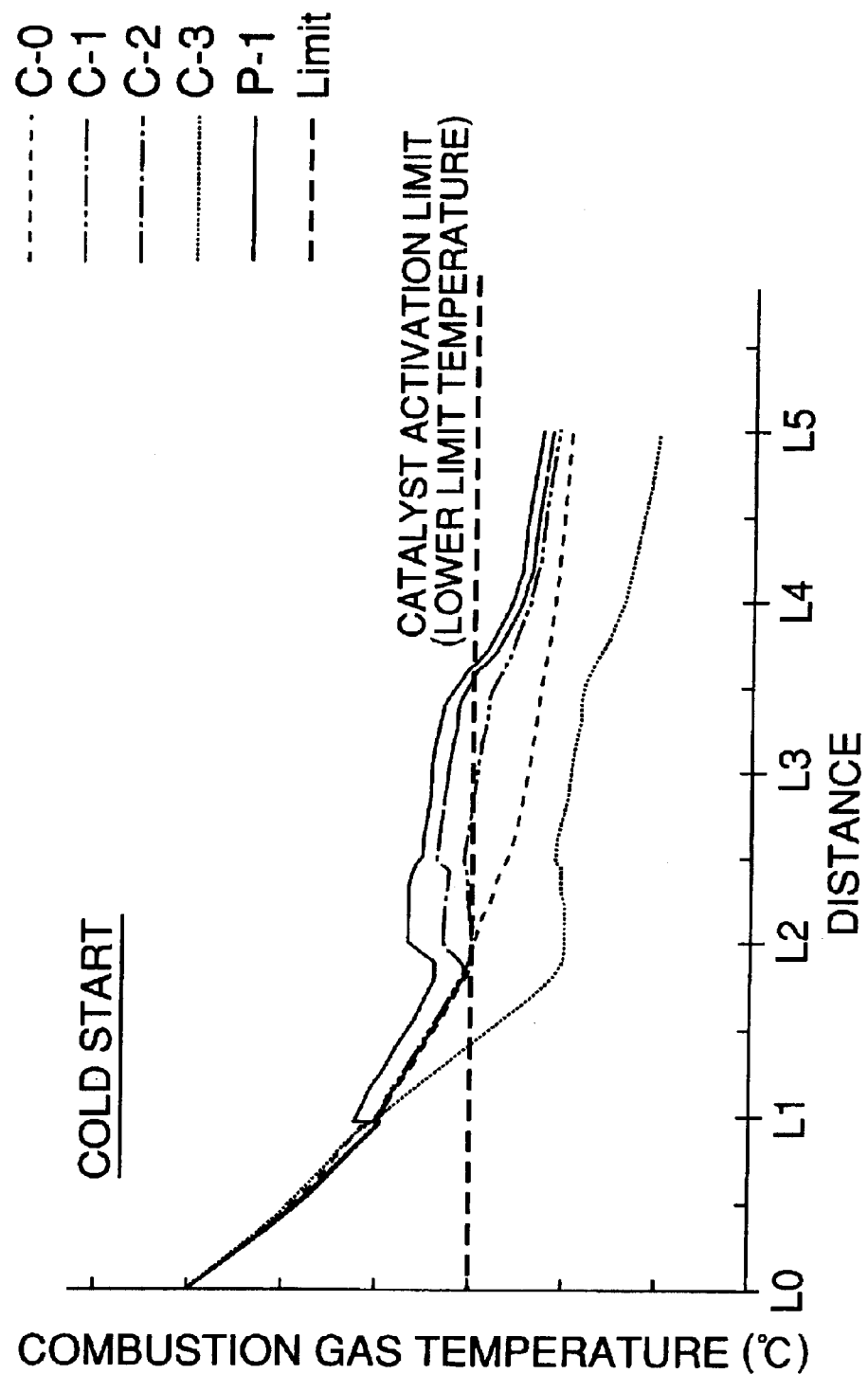

FIG. 14 shows the change in temperature of the exhaust gas from the upstream side to the downstream side (L0→L1→L2→L3→L4→L5) during a cool period immediately after starting the internal combustion engine 1. In accordance with Present Embodiment P-1, since the pre-catalytic systems 34 are disposed on the upstream side of the exhaust passage 33 and the capacity of the pre-catalytic systems 34 is set small, the temperature of the pre-catalytic systems 34 can be increased quickly to the catalyst activation temperature or above even during the cool period, thereby reducing the harmful components in the exhaust gas effectively.

Moreover, although the exhaust gas purification performance would be insufficient with only the small capacity pre-catalytic systems 34, disposition of the main catalytic systems 35 having a large capacity on the downstream side thereof can adequately compensate for the exhaust gas purification performance of the small capacity pre-catalytic systems 34. Furthermore, since the direction of flow of the exhaust gas is inverted between the inner layer parts 35a and the outer layer parts 35b of the main catalytic systems 35, when the exhaust gas passes firstly through the inner layer parts 35a of the main catalytic systems 35, its temperature increases due to the catalytic reaction, the exhaust gas having increased temperature is supplied to the outer layer parts 35b of the main catalytic systems 35, and when the exhaust gas turns around through 180°, harmful components in the exhaust gas are mixed effectively thus promoting the catalytic reaction in the outer layer parts 35b, and thereby enhancing the overall exhaust gas purification performance of the main catalytic systems 35. Moreover, the exhaust gas in the inner layer parts 35a is covered by the exhaust gas in the outer layer parts 35b, thus preventing thermal leakage and thereby preventing any degradation in the heat exchange efficiency.

Figure 15:
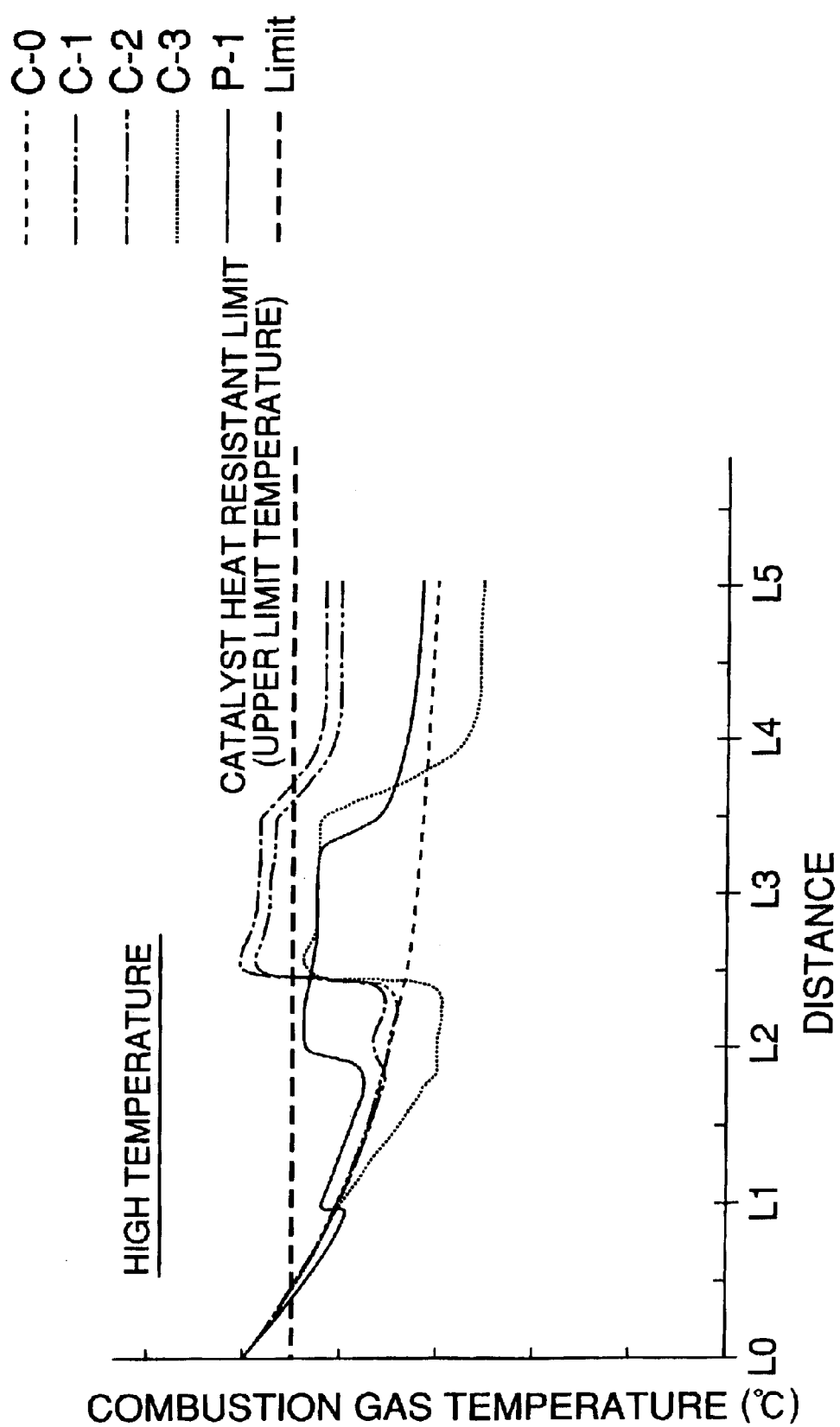

FIG. 15 shows the change in temperature of the exhaust gas from the upstream side to the downstream side when the internal combustion engine 1 is being operated at high temperature. In accordance with the Present Embodiment P-1, although there is a possibility of degradation due to exposure to high temperature exhaust gas because the pre-catalytic systems 34 are positioned close to the exhaust ports 18, since the fourth stage heat exchangers H4 and the fifth stage heat exchangers H5 are placed in the exhaust ports 18, it is possible to prevent the catalyst temperature of the pre-catalytic systems 34 from exceeding the heat resistant temperature. Furthermore, since, within the pre-catalytic systems 34, the catalyst supports 48 of the third stage heat exchangers H3 are divided into seven narrow pieces, and the zigzag-bent heat transfer tubes 49 of the third stage heat exchangers H3 are in direct contact with the peripheries of the catalyst supports 48, the catalyst temperature of the pre-catalytic systems 34 can more reliably be prevented from exceeding the heat resistant temperature.

Moreover, since the first stage heat exchanger H1, the second stage heat exchangers H2, the third stage heat exchangers H3, the fourth stage heat exchangers H4, and the fifth stage heat exchangers H5 are connected in line, and water is supplied sequentially from the first stage heat exchanger H1 side to the fifth stage heat exchangers H5 side (this water supply method is called one-way water supply), increasing/decreasing the amount of water supplied can appropriately control the temperatures of the pre-catalytic systems 34 and the main catalytic systems 35 according to the operational state of the internal combustion engine 1 (see Table 2).

TABLE 2

Comparison of cold starting characteristics and high temperature heat resistance

| | | Cold starting characteristics (early activation) | High temperature heat resistance (catalyst degradation) | Overall evaluation |
|---|---|---|---|---|
| Comparative Example | C-1 | Poor | Poor | Poor |
| | C-2 | Good | Poor | Poor |
| | C-3 :Control of flow rate of low temperature medium in heat exchanger | Poor : No | Good :No | Poor |
| Embodiment | P-1 :Control of flow rate of low temperature medium in heat exchanger | Good :Yes (flow rate: low) | Good :Yes (flow rate: high) | Good |

Figure 16:
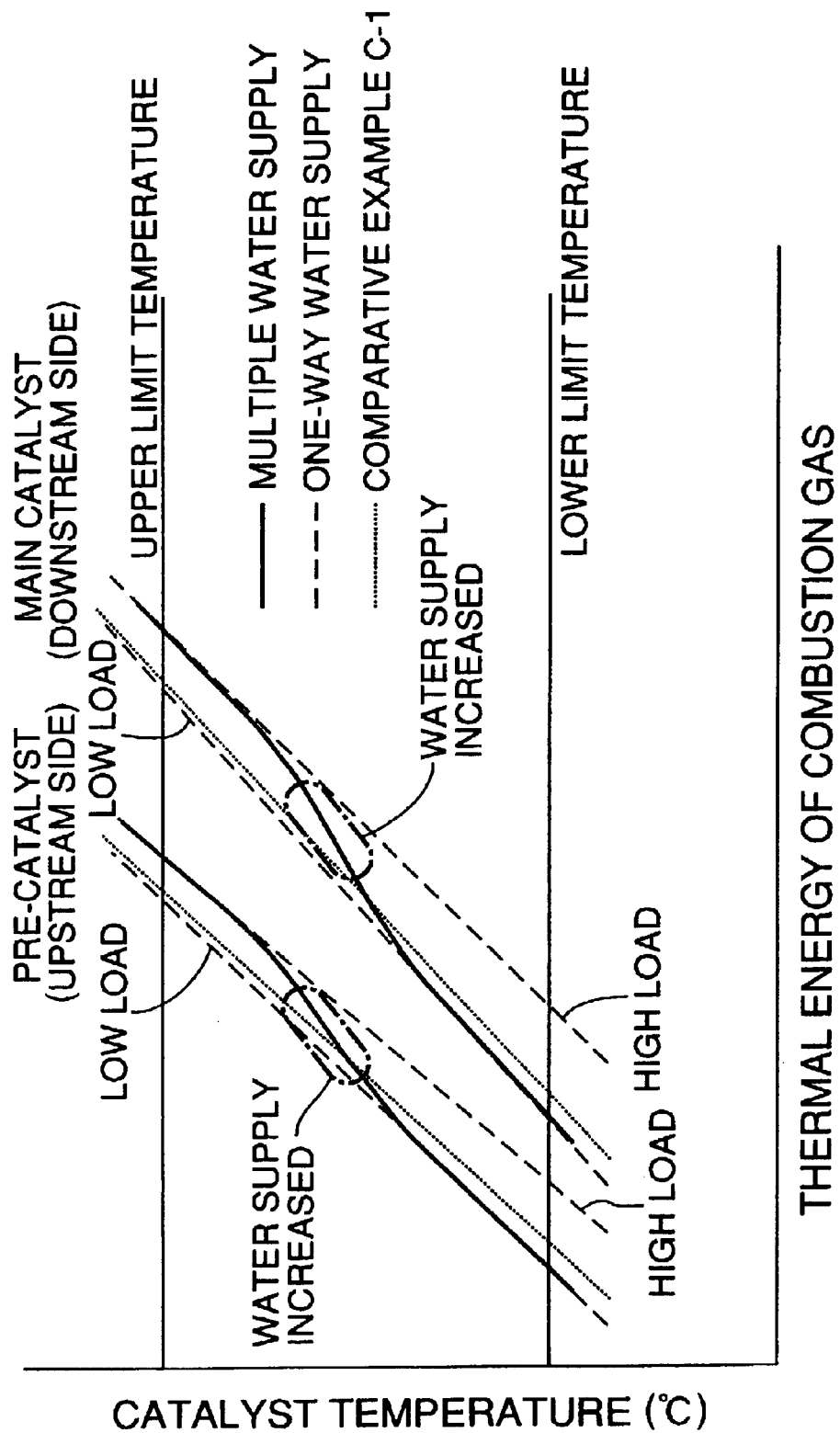

Furthermore, supplying water midstream at three positions in the water supply route from the first stage heat exchanger H1 to the fifth stage heat exchangers H5, that is, the first circular distribution passages 56 immediately upstream of the second stage heat exchangers H2, the second circular distribution passages 47 immediately upstream of the third stage heat exchangers H3, and the third circular distribution passages 43 immediately upstream of the fourth stage heat exchangers H4, and individually controlling the amount of water supplied to the second stage to fourth stage heat exchangers H2, H3, H4 according to changes in the operational state (the flow rate of the exhaust gas or the temperature of the exhaust gas) of the internal combustion engine 1 and the catalyst temperature (this water supply method is called multiple water supply) can yet more finely control the catalyst temperature of the pre-catalytic systems 34 and the main catalytic systems 35 at temperatures appropriate for the catalytic reaction (see Table 3 and FIG. 16).

TABLE 3

Ability to track catalyst temperature when thermal load fluctuates

| | | Operational status of combustion system (thermal load) | | | | | | | | |
|---|---|---|---|---|---|---|---|---|---|---|
| | | Low thermal load | | | Medium thermal load | | | High thermal load | | |
| Flow rate control method | State of catalyst | Temp. range | Track-ability | Purification performance | Temp. range | Track-ability | Purification performance | Temp. range | Track-ability | Purification performance |
| One way water supply Midstream water supply | Pre-catalyst Main catalyst :Total amount of water supplied | Good Lower | Rapid Slow (None) Small | Good Poor | Good Lower | Rapid Slow (None) Medium | Good Poor | Good Lower | Rapid Slow (None) Large | Good Poor |
| Multiple water supply Midstream water supply | Pre-catalyst Main catalyst (Position of midstream water supply) :Midstream water supplied :total amount of water supplied | Good Good (A) :Trace | Rapid Rapid (B) :Trace :Small | Good Good (C) :Trace | Good Good (A) :Trace | Rapid Rapid (B) :Low :Medium | Good Good (C) :Low | Good Good (A) :Low | Rapid Rapid (B) :Medium :Large | Good Good (C) :High |

The effect of multiple water supply is further explained by reference to FIG. 16. When carrying out one way water supply, as shown by a broken line, if the amount of water supplied is set small in line with a low load state of the internal combustion engine 1, the catalyst temperature passes the lower limit temperature (catalyst activation temperature) earlier, but it also quickly goes beyond the upper limit temperature (catalyst heat resistant temperature). Conversely, if the amount of water supply is set large in line with a high load state of the internal combustion engine 1, although the catalyst temperature passes the lower limit temperature (catalyst activation temperature) slowly, going beyond the upper limit temperature (catalyst heat resistant temperature) can be delayed. It is thus difficult to achieve both early activation and durability of the catalyst with the one way water supply, but by setting the amount of water supplied low when the internal combustion engine 1 is in a low load state and increasing the amount of water supplied by midstream water supply while the load is increasing, both early activation and durability of the catalyst can be achieved.

The reason why the lines for the pre-catalytic systems 34 are on the left side and the lines for the main catalytic systems 35 are on the right side in FIG. 16 is that the capacity of the pre-catalytic systems 34 is small and the capacity of the main catalytic systems 35 is large. It is of course possible to control the temperatures of the pre-catalytic systems 34 and the main catalytic systems 35 yet more finely by individually controlling the amounts of water supplied to the midstream water inlets at the three positions.

As hereinbefore described, in accordance with Present Embodiment P-1, in comparison with Comparative Examples C-0 to C-3, the overall exhaust gas purification performance and durability of the catalytic system can be enhanced. In particular, integral provision of the third stage heat exchangers H3 within the pre-catalytic systems 34 can actively control the temperature of the pre-catalytic systems 34, and midstream water supply to the first circular distribution passages 56, the second circular distribution passages 47, and the third circular distribution passages 43 in the vicinity of the pre-catalytic systems 34 can not only control the temperature of the pre-catalytic systems 34 themselves but can also appropriately control the temperature of the main catalytic systems 35 positioned downstream thereof, thereby greatly enhancing the overall exhaust gas purification performance.

With regard to the heat transfer surface densities (heat transfer area/volume) of the five heat exchangers H1 to H5, that of the first stage heat exchanger H1 is the highest, and the surface density gradually decreases therefrom toward the fifth stage heat exchangers H5. Furthermore, with regard to the passage cross sectional areas of the five heat exchangers H1 to H5, that of the first stage heat exchanger H1 is the smallest, and the cross sectional area gradually increases therefrom toward the fifth stage heat exchangers H5. The heat transfer surface densities and the passage cross sectional areas of the first stage to fourth stage heat exchangers H1 to H4 are shown in Table 4.

TABLE 4

Comparison of heat transfer surface density and passage cross sectional area among heat exchangers of different stages

|  | Heat transfer surface density ($m^{-1}$) | Passage cross sectional area ($m^2$) |
| --- | --- | --- |
| First stage heat exchanger | 680 | 0.0008 |
| Second stage heat exchanger | 480 | 0.0009 |
| Third stage heat exchanger | 440 | 0.0009 |
| Fourth stage heat exchanger | 90 | 0.001 |

Gradually decreasing the heat transfer surface density (heat transfer area/volume) from the first stage heat exchanger H1 to the fifth stage heat exchangers H5 minimizes the heat transfer surface density of the fifth stage heat exchangers H5, through which high temperature exhaust gas passes because they are close to the combustion chambers 16, and maximizes the heat transfer surface density of the first stage heat exchanger H1, through which the exhaust gas whose temperature has decreased passes after passing through the exhaust passage 33, thereby averaging the heat exchange efficiencies across all of the five heat exchangers H1 to H5.

Furthermore, since the exhaust gas coming out of the combustion chambers 16 has a high temperature and a large volume, and as a result a high flow rate, maximizing the passage cross sectional area of the fifth stage heat exchangers H5 close to the combustion chambers 16 can minimize the pressure loss. On the other hand, since the exhaust gas that has decreased in temperature after passing through the exhaust passage 33 has decreased volume and also a decreased flow rate, minimizing the passage cross sectional area of the first stage heat exchanger H1 can make the evaporator 3 compact.

The effects obtained by setting the heat transfer surface densities and the passage cross sectional areas of the first stage heat exchanger H1 to the fourth stage heat exchangers H4 as shown in Table 3 are summarized in Table 5.

TABLE 5

Prior art (uniform structure)

|  | Earlier stage (exhaust gas high temperature section) | Later stage (exhaust gas low temperature section) |
| --- | --- | --- |
| Heat exchange | High | Low |
| Pressure loss of exhaust gas | High | Low |
| Pressure loss of water (vapor) | High | Low |

Area through which exhaust gas and water pass: earlier stage ≥ later stage

Heat transfer surface density: earlier stage ≤ later stage

Improvement

Present Invention

|  | Earlier stage (exhaust gas high temperature section) | Later stage (exhaust gas low temperature section) |
| --- | --- | --- |
| Heat exchange | High | High |
| Pressure loss of exhaust gas | Low | Low |
| Pressure loss of water (vapor) | Low | Low |

Further effects that can be expected: More compact, Lower pressure loss

Figure 17:
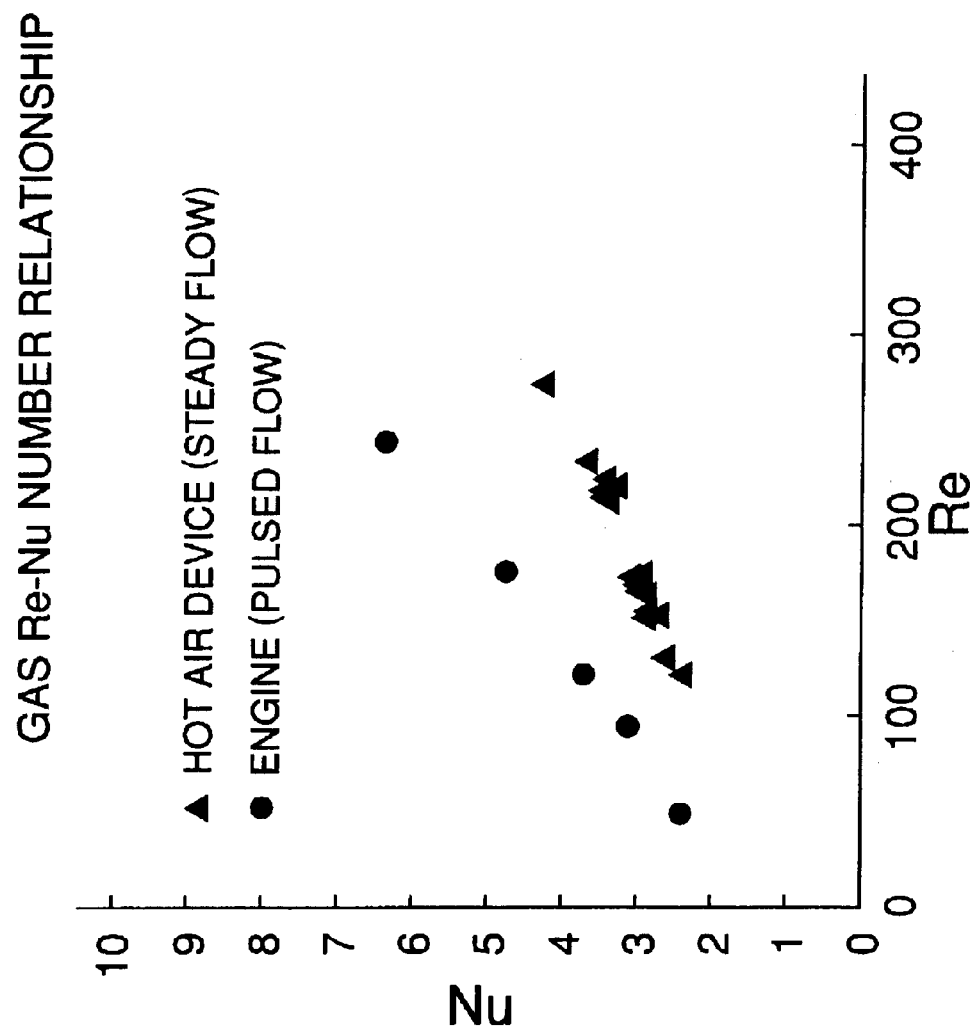
Figure 18:
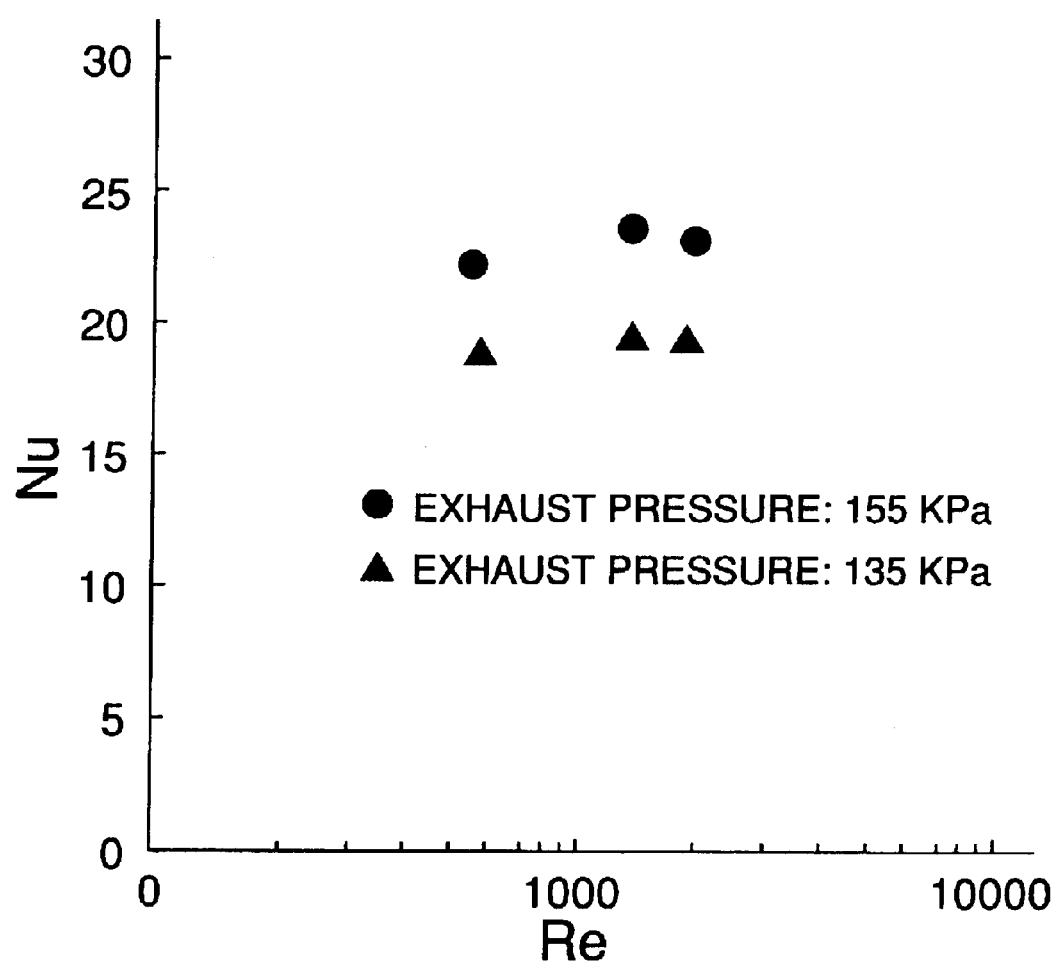

It should be noted here that the second stage to fifth stage heat exchangers H2 to H5, which are heat exchangers in the earlier stage as seen from the internal combustion engine 1, are provided for each one of the exhaust ports 18, and since the exhaust gases coming from the exhaust ports 18 are not mixed, it is possible to avoid the occurrence of exhaust interference, thereby preventing any decrease in the output of the internal combustion engine 1. Furthermore, since there are pressure pulsations in the exhaust gas at the exits of the exhaust ports 18, and the exhaust pressure is high, a heat transfer promoting effect can be expected. FIG. 17 shows a comparison of the heat transfer performance at several Reynolds numbers between a hot air device without exhaust pulsations and an internal combustion engine with exhaust pulsations, and it confirms that the internal combustion engine with exhaust pulsations has the higher heat transfer performance. FIG. 18 shows a comparison of the heat transfer performance at several Reynolds numbers at two different exhaust pressures in a single cylinder internal combustion engine provided with a grouped pipe type heat exchanger, and it confirms that the higher the exhaust pressure, the higher the heat transfer performance.

In the first stage heat exchanger H1, which is a heat exchanger in the later stage as seen from the internal combustion engine 1, since the exhaust gases coming from the three exhaust ports 18 are combined into a non-pulsed flow, the exhaust gas can be maintained at a constant high temperature and, unlike pulsed flow, the exhaust gas can be made to have a steady flow that does not stop, thereby preventing any deterioration in the heat exchange performance.

Moreover, since the exhaust gas flows from the internal combustion engine 1 side to the exhaust pipe 32 side, whereas water flows from the exhaust pipe 32 side to the internal combustion engine 1 side, the exhaust gas and the water are in a cross-flow state, and the difference in temperature between the exhaust gas and the water can therefore be maximized across all of the first stage to fifth stage heat exchangers H1 to H5, thereby contributing to an enhancement of the heat exchange efficiency between the exhaust gas and the water.

Figure 4:
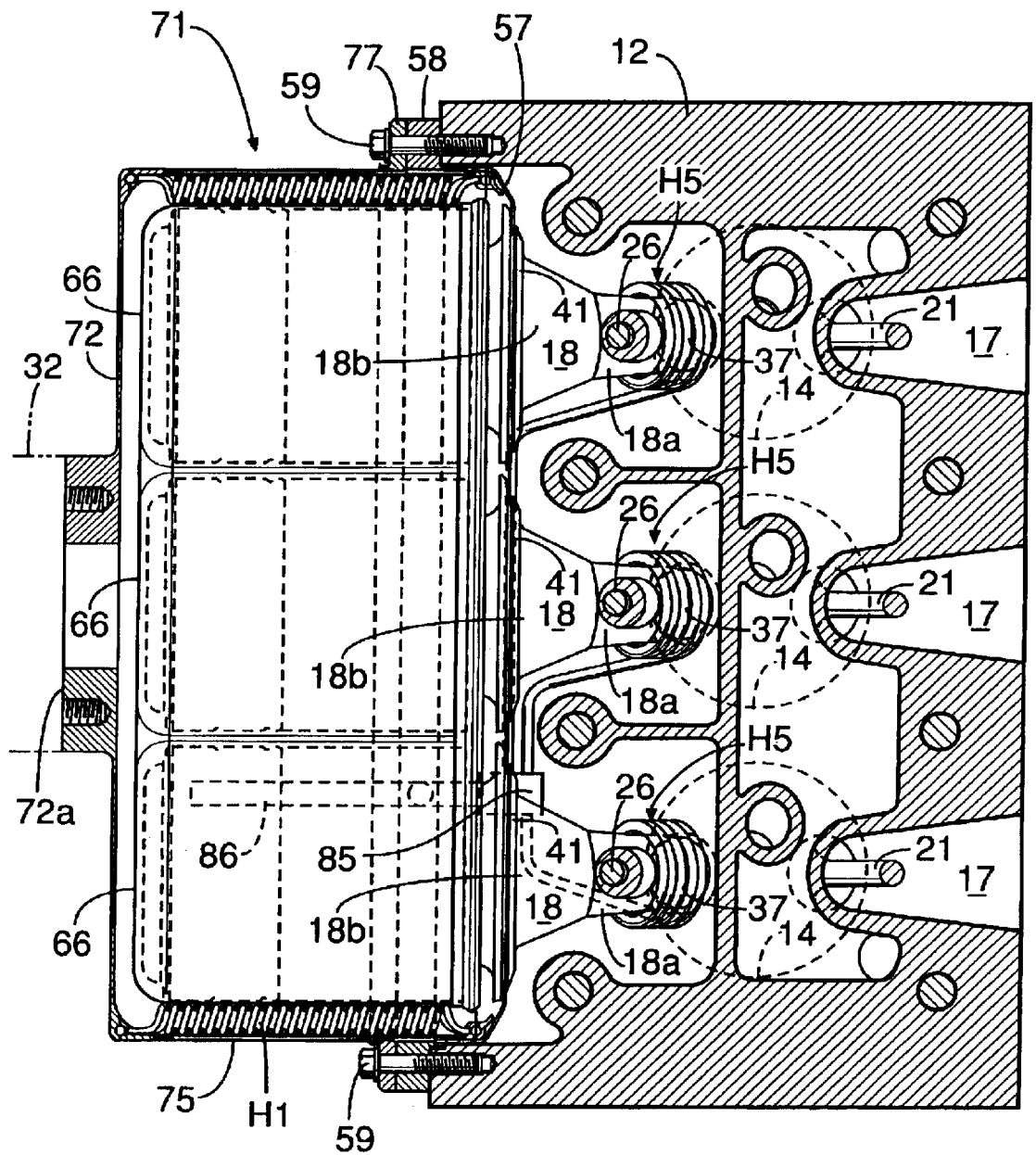
Figure 5:
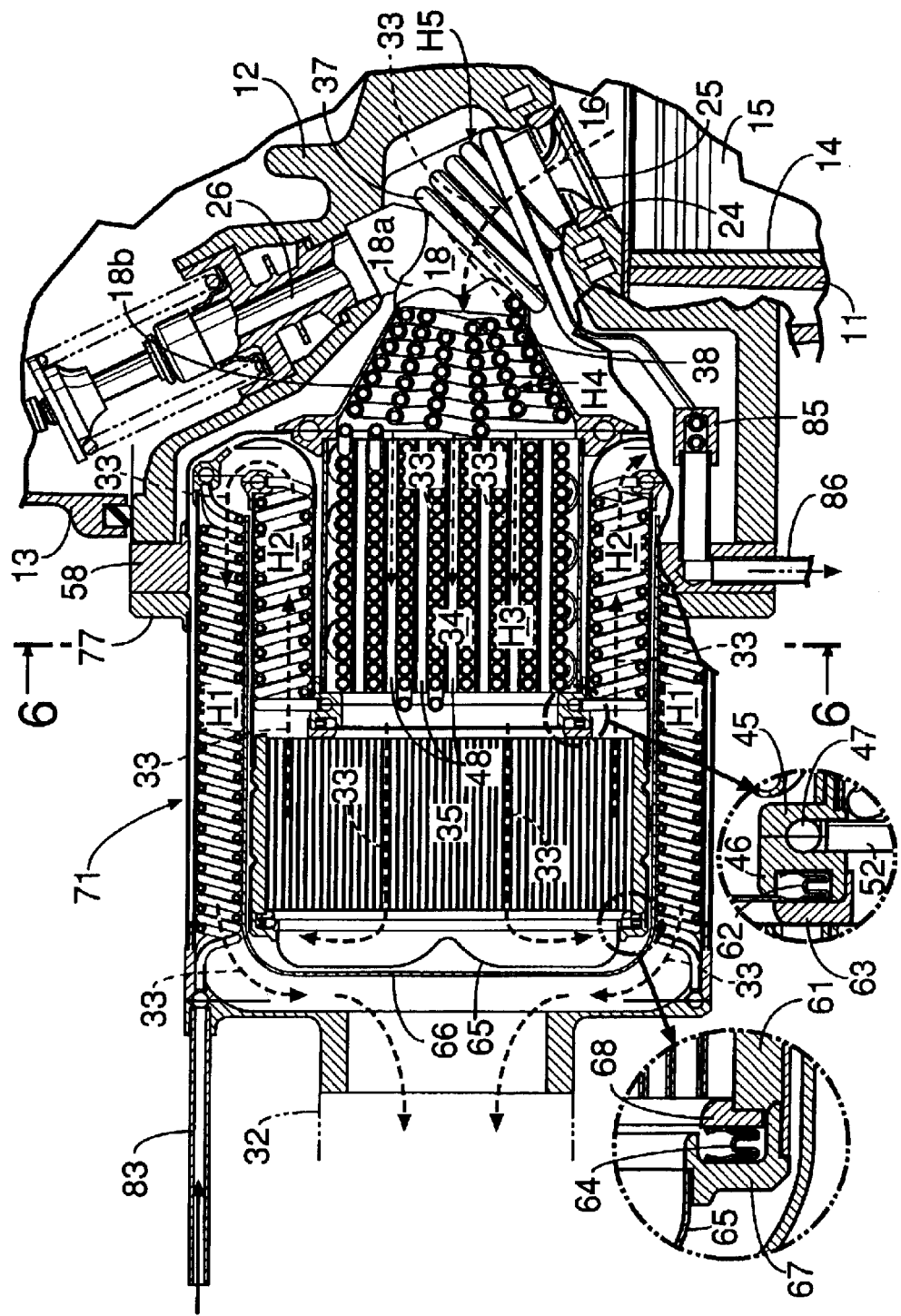
Figure 6:
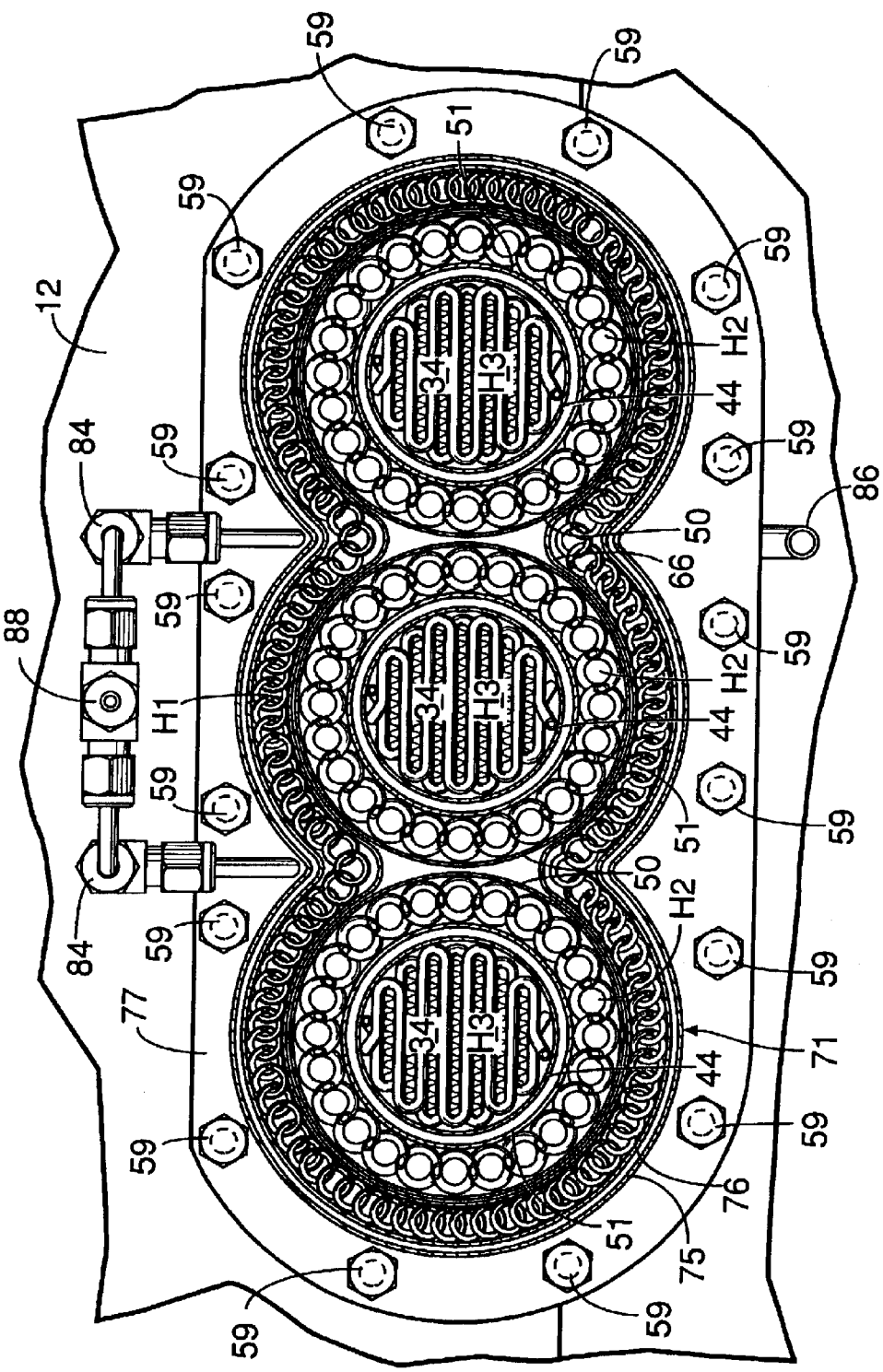

Furthermore, as is clear from FIG. 4, the width of the evaporator 3 (width of the internal combustion engine 1 in the direction of the crankshaft) differs little from the width of the three cylinder bores 14, and it is extremely compact. Moreover, not only can the evaporator 3 be detached from the cylinder head 12 by merely loosening the sixteen bolts 59, thus providing ease of maintenance, but also the entire evaporator 3 is integrated with high rigidity by the cover 71, thereby enhancing the durability against vibration of the internal combustion engine 1.

Furthermore, since the exhaust passage 33 is bent into a three stage zigzag shape and the first stage to fourth stage heat exchangers H1 to H4 are disposed in layers in the radial direction, the overall dimensions of the evaporator 3 can be reduced as much as possible while minimizing thermal leakage and preventing noise from being dissipated from the interior of the evaporator 3, thereby providing a compact layout thereof in the cylinder head 12 of the internal combustion engine E.

Moreover, since the first stage to fifth stage heat exchangers H1 to H5 are arranged in a labyrinth form by disposing the pre-catalytic systems 34 and the main catalytic systems 35 in layers in the radial direction, not only can their silencing effect be effective in preventing exhaust noise from leaking outside the waste heat recovery system 2, but also an exhaust gas temperature lowering effect can be given, mainly by the first stage to fifth stage heat exchangers H1 to H5. This allows an exhaust muffler to be simplified or omitted, thereby making the exhaust system itself compact and lightweight. Furthermore, since the decrease in exhaust gas temperature causes the temperature of the exhaust passage to decrease, in particular, on the downstream side of the first stage heat exchanger H1, the degrees of freedom in designing with regard to heat resistance increase, and the use of a material such as a plastic for the exhaust passage becomes possible. As a result, the degrees of freedom in the shape of the exhaust passage, the degrees of freedom in mounting on a vehicle, the degrees of freedom in terms of cooling characteristics, etc. increase, and the degrees of freedom in the design of the entire vehicle, which has been subjected to restrictions by conventional exhaust systems, can be increased, thereby contributing to a reduction in the overall weight of the exhaust system.

Next, the second embodiment of the present invention is explained by reference to FIGS. 19 to 29.

Figure 19:
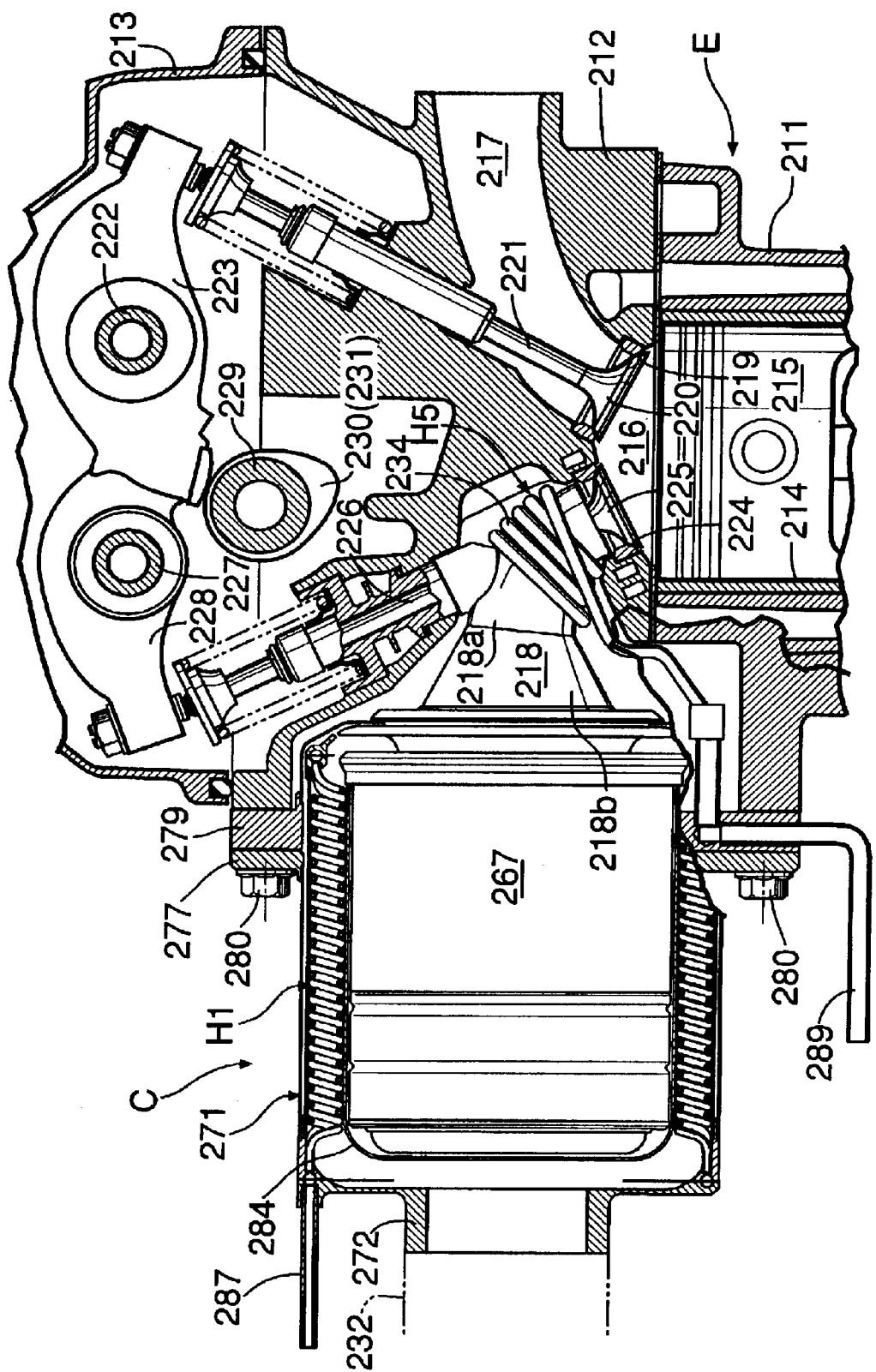

As shown in FIG. 19, an internal combustion engine E includes a cylinder block 211, a cylinder head 212, and a head cover 213, which are laminated one on another, and a piston 215 is slidably fitted in a cylinder bore 214 formed in the cylinder block 211. Among an intake port 217 and an exhaust port 218 individually communicating with a combustion chamber 216 formed in the cylinder head 212, the intake port 217 is bored within the cylinder head 212 as is conventional, but the exhaust port 218 is formed from a separate member and joined to the cylinder head 212.

The upper end of a stem 221 of an intake valve 220 that opens and closes an intake valve hole 219 abuts against one end of an intake rocker arm 223 pivotably supported on an intake rocker arm shaft 222, and the upper end of a stem 226 of an exhaust valve 225 that opens and closes an exhaust valve hole 224 abuts against one end of an exhaust rocker arm 228 pivotably supported on an exhaust rocker arm shaft 227. The other end of the intake rocker arm 223 and the other end of the exhaust rocker arm 228 abut against an intake cam 230 and an exhaust cam 231 respectively provided on a camshaft 229 rotating in association with a crankshaft, which is not illustrated, thereby making the intake valve 220 and the exhaust valve 225 open and close.

Provided on the side face of the cylinder head 212 on the exhaust side is an integrated evaporator type exhaust gas purification system C. The structure of the integrated evaporator type exhaust gas purification system C is explained by reference to FIGS. 20 to 29.

The evaporator generates vapor having increased temperature and pressure using the exhaust gas from the internal combustion engine E as a heat source, and includes an exhaust passage 233 having the exhaust port 218 as a base end and extending to an exhaust pipe 232, and heat exchangers H1 to H5 disposed within the exhaust passage 233 and carrying out heat exchange with the exhaust gas; and metal catalytic systems 246A to 246D, which will be described later, are incorporated into the third stage heat exchanger H3.

The exhaust port 218 is formed from a uniform diameter part 218a positioned on the upstream side of the flow of the exhaust gas, and having a substantially constant diameter, and an increasing diameter part 218b provided so as to be connected to the downstream side of the uniform diameter part 218a and having a diameter that increases in a trumpet shape; the fifth stage heat exchanger H5 is provided around the outer periphery of the uniform diameter part 218a, and the fourth stage heat exchanger H4 is provided within the increasing diameter part 218$b$. The fifth stage heat exchanger H5 is formed from about 5 turns of a single heat transfer tube 234 wound around the outer periphery of the uniform diameter part 218$a$. The fourth stage heat exchanger H4 is formed from multiple windings of a single heat transfer tube 235 and is housed within the increasing diameter part 218$b$, and the heat transfer tube 234 of the fifth stage heat exchanger H5 runs through an opening (not illustrated) formed in the exhaust port 218 and is connected to the heat transfer tube 235 of the fourth stage heat exchanger H4.

As is clear from reference to FIGS. 27A to 27C, the heat transfer tube 235 of the fourth stage heat exchanger H4 is wound in a triple coil shape that is tapered so as to follow the shape of the interior of the increasing diameter part 218$b$ of the exhaust port 218; the coil in the inner layer is wound from the rear (the left-hand side in the figure) toward the front (the right-hand side in the figure) while decreasing in diameter and is folded back at the front end; this is followed by the coil in the middle layer, which is wound from the front toward the rear while increasing in diameter and is folded back at the rear end; and this is followed by the coil in the outer layer, which is wound from the rear toward the front while decreasing in diameter. A water inlet shown in FIG. 27B is connected to the third stage heat exchanger H3, which is on the upstream side and will be described later, and a water outlet shown in FIG. 27C is connected to the heat transfer tube 234 of the fifth stage heat exchanger H5, which is on the downstream side. The circled numerals to shown in FIG. 27A show the route via which water flows through the heat transfer tube 235.

Winding the heat transfer tube 235 of the fourth stage heat exchanger H4 in the triple coil shape that is tapered so as to follow the shape of the interior of the increasing diameter part 218$b$ of the exhaust port 218 makes it possible to have a rectifying effect on the exhaust gas that flows through the increasing diameter part 218$b$, thereby contributing to a reduction in the circulation resistance.

Figure 20:
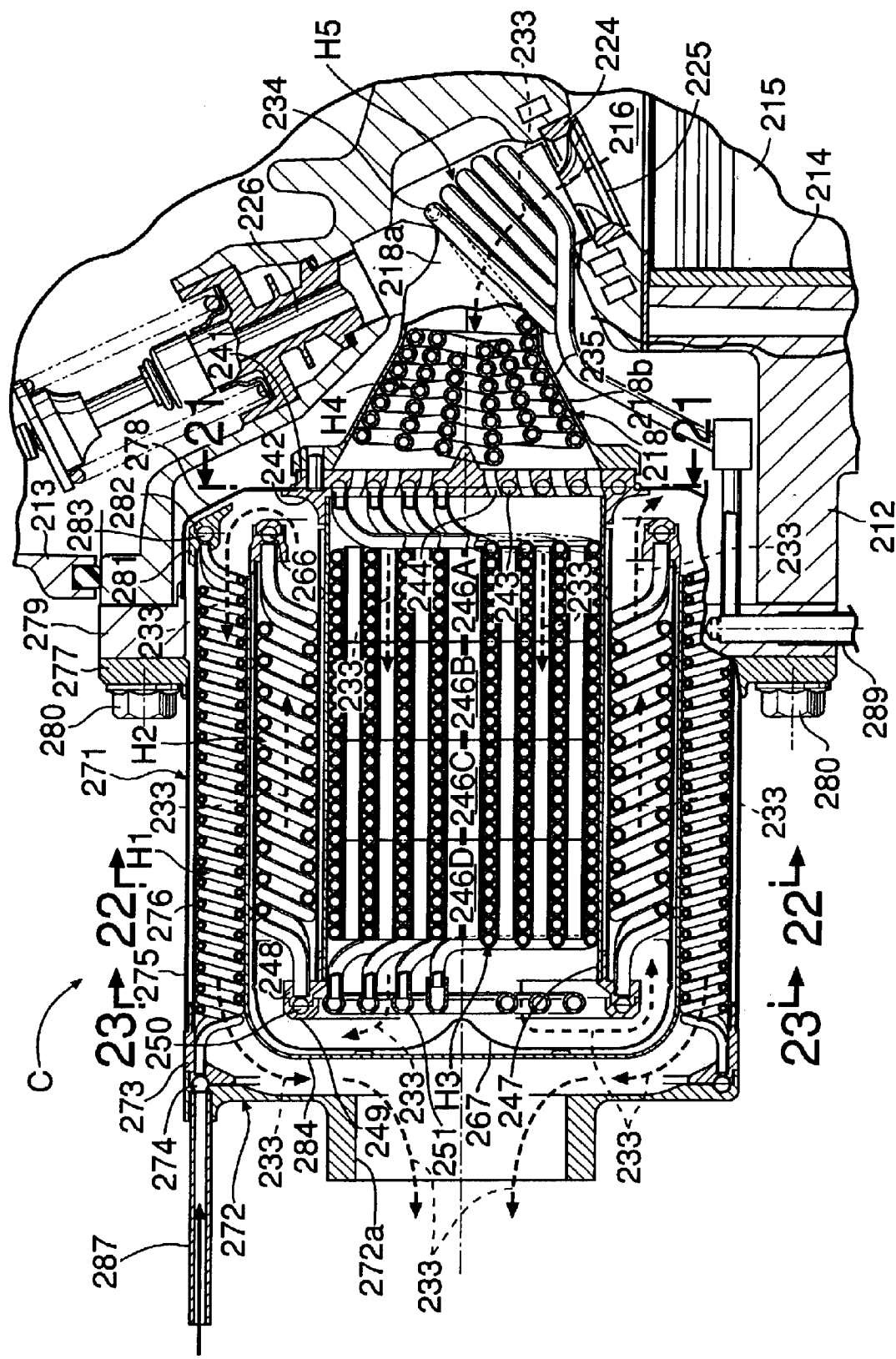
Figure 21:
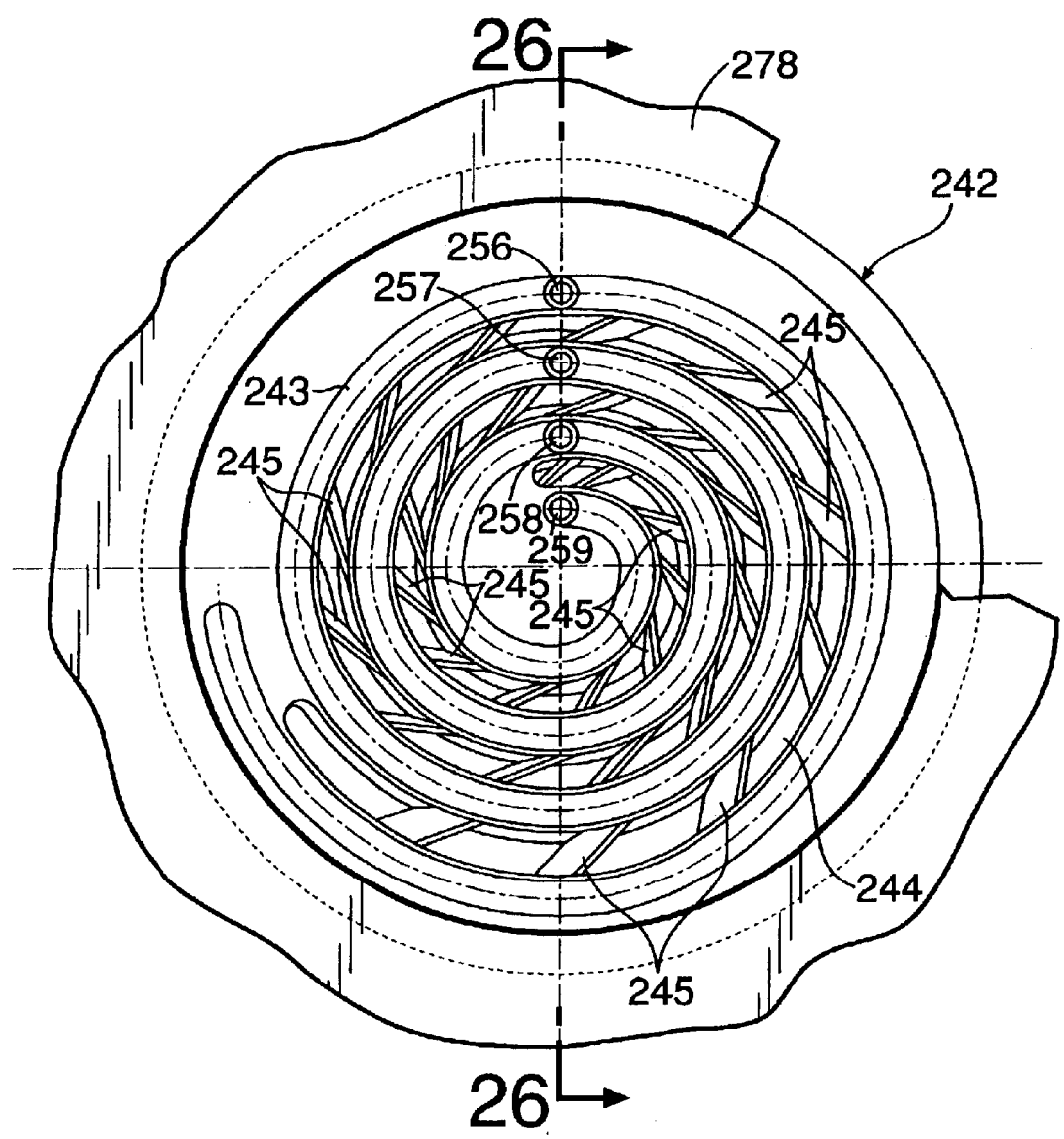
Figure 22:
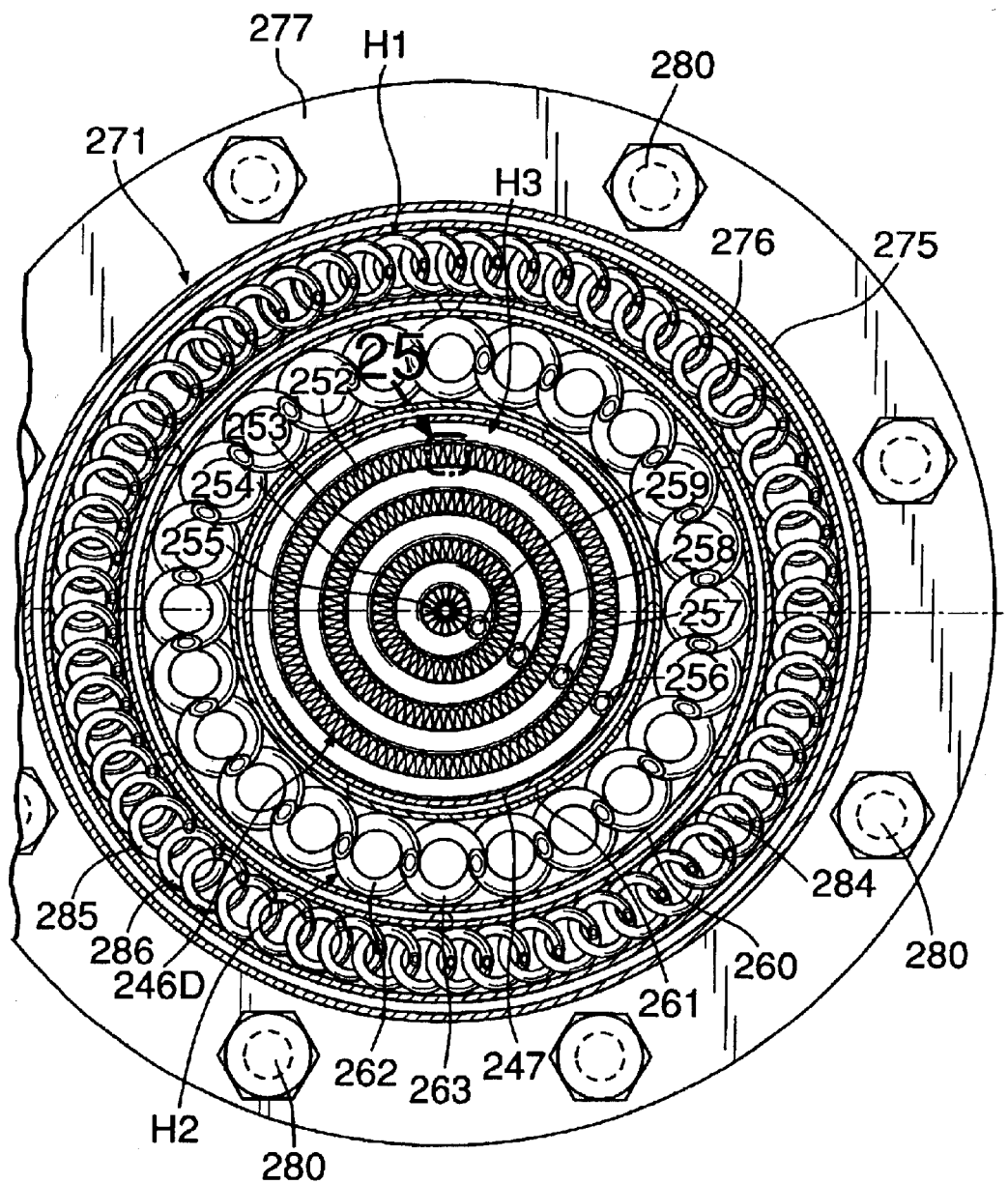
Figure 23:
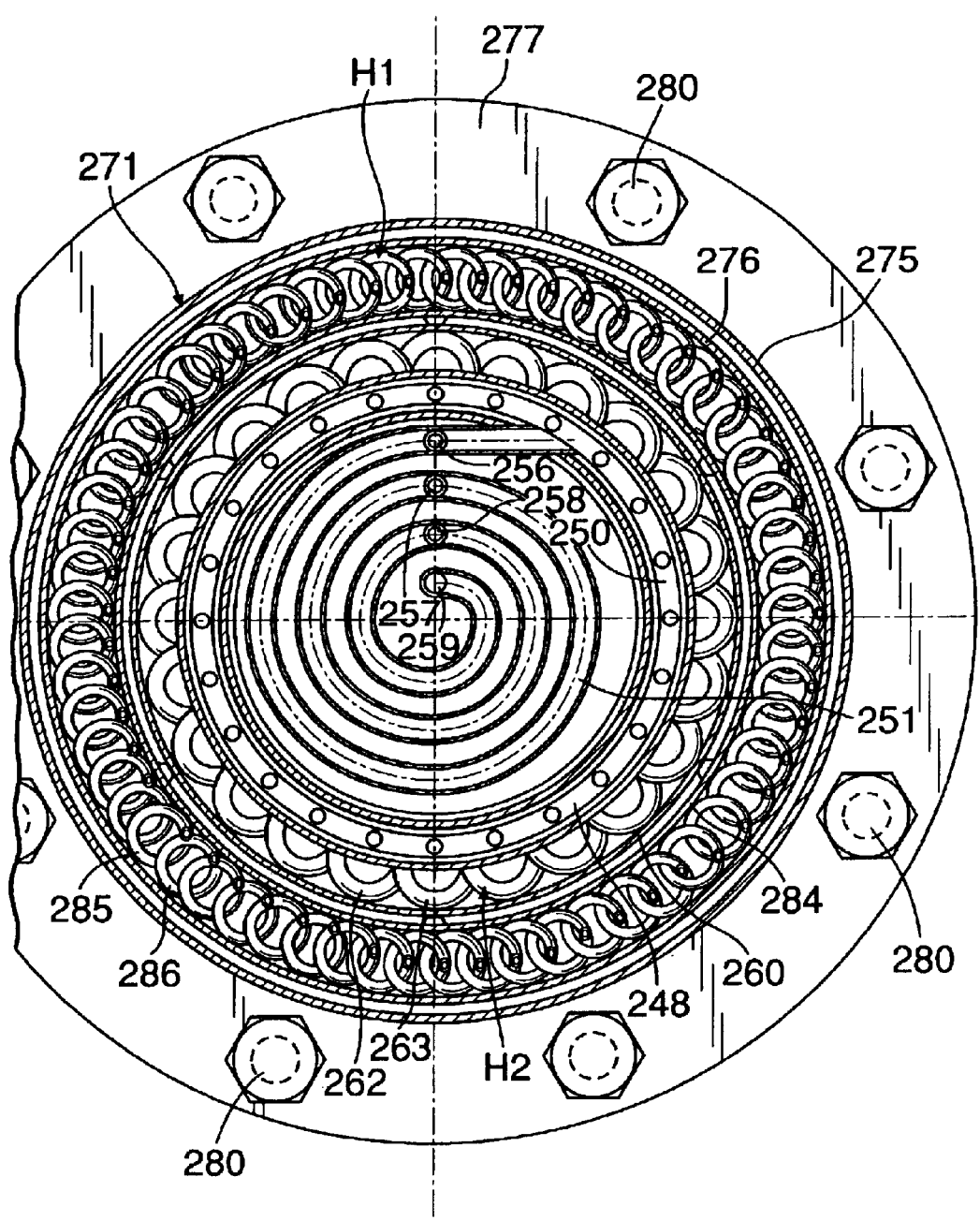
Figure 24:
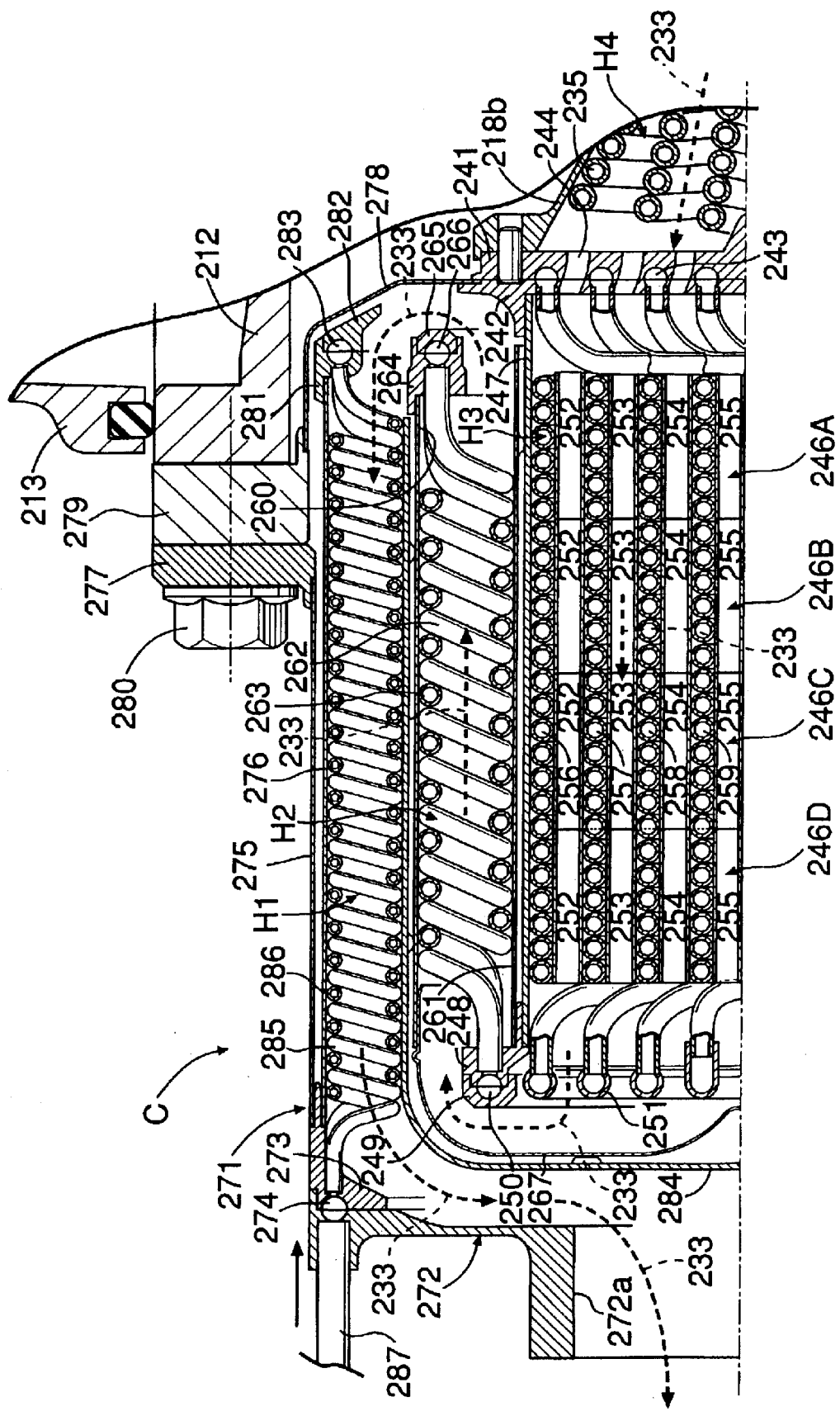
Figure 26:
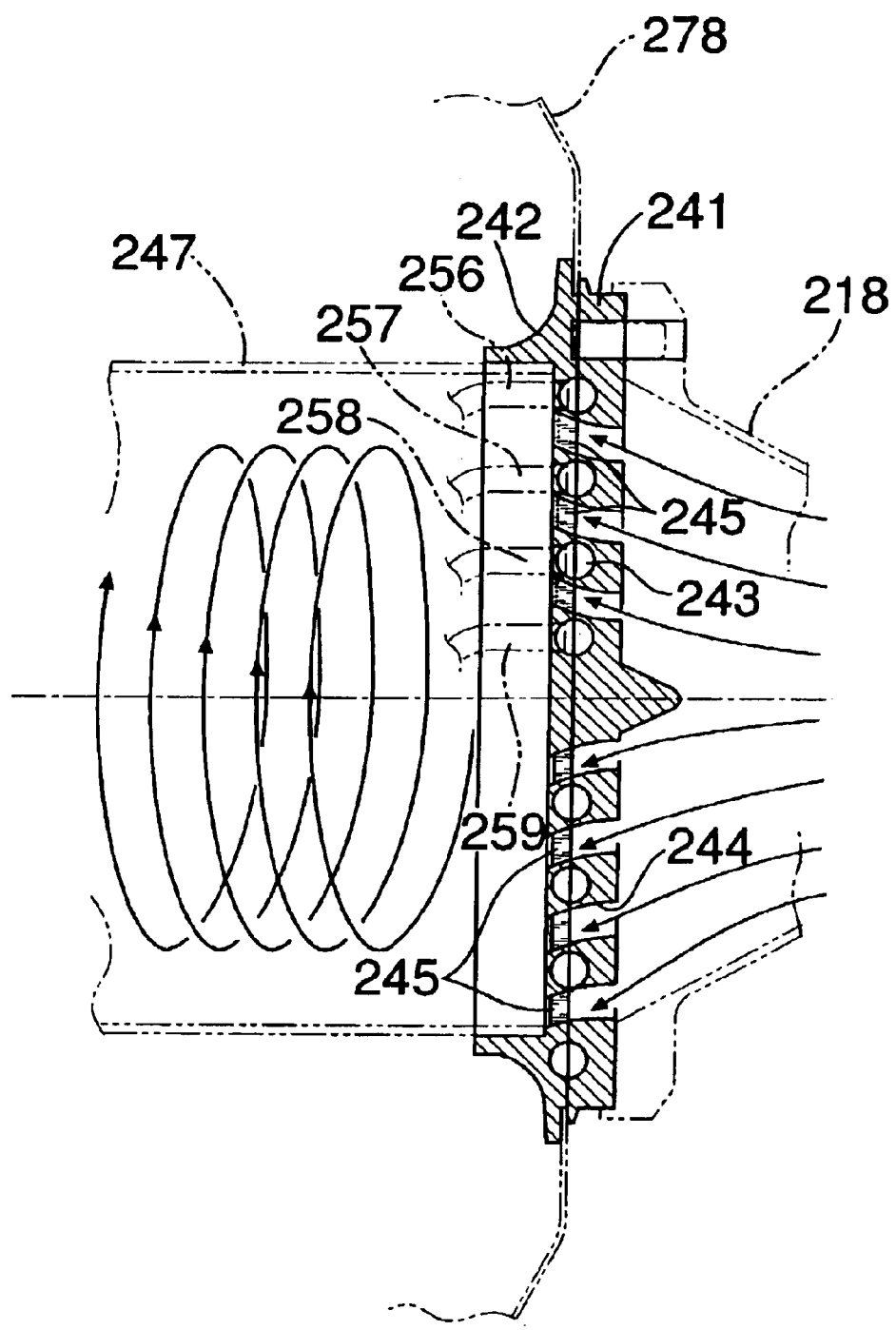

As is most clearly shown in FIGS. 20, 21 and 26, a disk-shaped distribution passage forming member 241 is joined to the rear end of the increasing diameter part 218$b$ of the exhaust port 218, and by joining another disk-shaped distribution passage forming member 242 to the rear face of the distribution passage forming member 241, a second helical distribution passage 243 is formed between the two distribution passage forming members 241, 242. The radially outer end of the second helical distribution passage 243 is connected to the upstream end of the heat transfer tube 235 of the fourth stage heat exchanger H4. A helical opening 244 is formed in the two distribution passage forming members 241, 242 so as to follow the second helical distribution passage 243. The cross section of the second helical opening 244 is inclined radially outward at the exit side so as to follow the inclination of the increasing diameter part 218$b$ of the exhaust port 218, and a large number of guide vanes 245 are attached to the interior thereof in an inclined manner. The exhaust gas supplied from the increasing diameter part 218$b$ of the exhaust port 218 therefore flows in a spiral while diffusing radially outward when passing is through the helical opening 244.

Figure 25:
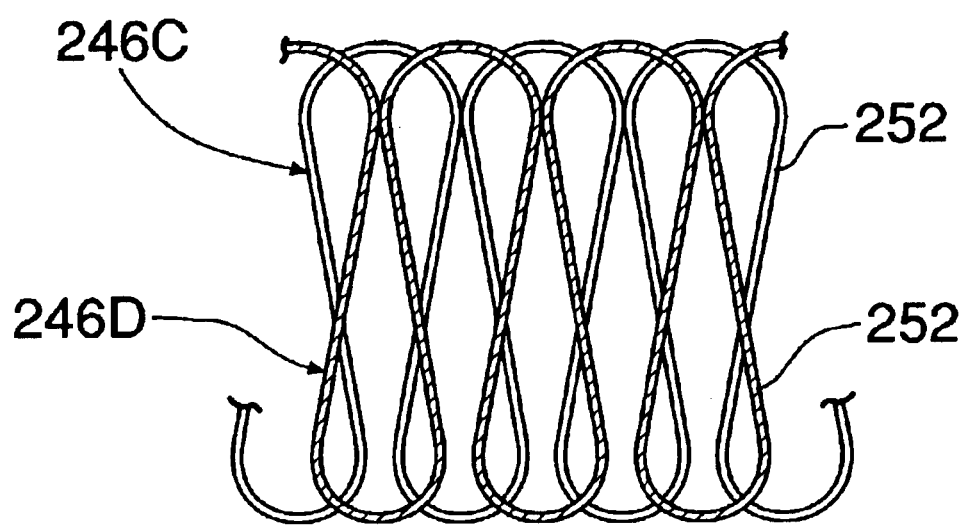

As is most clearly shown in FIGS. 20, 22 to 24, and 28, the front end of a cylindrical case 247 covering the outer peripheries of the first stage metal catalytic system 246A to the fourth stage metal catalytic system 246D and the third stage heat exchanger H3 is joined to the distribution passage forming member 242, a fourth circular distribution passage 250 is formed between two annular distribution passage forming members 248, 249, which are superimposed one on another and joined to the rear end of the cylindrical case 247, and the fourth circular distribution passage 250 is connected to the outer end of a first helical distribution passage 251 formed by curving a pipe in a helical shape. The first stage metal catalytic system 246A to the fourth stage metal catalytic system 246D, which are disposed in line, are each made by forming concentrically disposed annular corrugated metal supports 252 to 255 having four different diameters and supporting an exhaust gas purification catalyst on the surface thereof. As shown in FIG. 25 in a magnified manner, the phases of the corrugations of the metal supports 252 to 255 of each stage of the metal catalytic systems 246A to 246D are displaced by half a pitch from each other.

The third stage heat exchanger H3 is formed from four heat transfer tubes 256 to 259 that have different diameters and are wound in a coiled shape (see FIG. 28). The four heat transfer tubes 256 and 259 are housed within the cylindrical case 247 so that they are concentric with and disposed alternately with the four metal supports 252 to 255 of the first stage metal catalytic system 246A to the fourth stage metal catalytic system 246D. The downstream ends of the four heat transfer tubes 256 to 259 are connected to an intermediate portion of the second helical distribution passage 243, and the upstream ends of the four heat transfer tubes 256 to 259 are connected to an intermediate portion of the first helical distribution passage 251.

Two cylindrical cases 260, 261 are coaxially disposed radially outside the cylindrical case 247 covering the outer peripheries of the first stage metal catalytic system 246A to the fourth stage metal catalytic system 246D and the third stage heat exchanger H3, and the second stage heat exchanger H2 is disposed in an annular form between the two cylindrical cases 260, 261. The second stage heat exchanger H2 is formed from a large number of heat transfer tubes 262 wound in a coiled shape in one direction and a large number of heat transfer tubes 263 wound in a coiled shape in the other direction, the tubes 262, 263 being disposed alternately so that parts thereof are meshed together, thereby increasing the placement density of the heat transfer tubes 262, 263 within the space. The outer peripheries of the first stage metal catalytic system 246A to the fourth stage metal catalytic system 246D, and the third stage heat exchanger H3 are thus surrounded by the heat transfer tubes 262, 263 of the second stage heat exchanger H2.

A third circular distribution passage 266 is formed between an annular distribution passage forming member 264 fixed to the front end of the outer cylindrical case 260 and an annular distribution passage forming member 265 joined to the front face of the distribution passage forming member 264. The upstream ends of the heat transfer tubes 262, 263 of the second stage heat exchanger H2 are connected to the third circular distribution passage 266, and the downstream ends of the heat transfer tubes 262, 263 are connected to the fourth circular distribution passage 250. Fixed to the rear end of the cylindrical case 260 covering the outside of the second stage heat exchanger H2 is a dish-shaped end cap 267 covering the rear faces of the first stage metal catalytic system 246A to the fourth stage metal catalytic system 246D and the third stage heat exchanger H3.

A detachable cover 271 forming the outer boundary of the integrated evaporator type exhaust gas purification system C includes a plate-shaped distribution passage forming member 272 having an exhaust hole 272$a$ connected to the exhaust pipe 232 in its center and an annular distribution passage forming member 273 joined to the front face of the distribution passage forming member 272, and a first circular distribution passage 274 is formed between the two distribution passage forming members 272, 273. A cylindrical case 275 positioned radially outside and a cylindrical case 276 positioned radially inside extend forward, with a slight gap therebetween, from the distribution passage forming member 273, and a flange 277 provided on the front end of the outer cylindrical case 275 is superimposed on a flange 279 provided on the rear end of a mounting plate 278 fixed to the distribution passage forming member 242 and they are tightened together to the cylinder head 212 by bolts 280.

An annular distribution passage forming member 281 is fixed to the front end of the inner cylindrical case 276, and a second circular distribution passage 283 is formed by joining an annular distribution passage forming member 282 to the front face of the distribution passage forming member 281. The first circular distribution passage 274 and the second circular distribution passage 283 have an identical shape and face each other in the rear to front direction. A cup-shaped inner wall member 284 is housed within the cover 271, and the first stage heat exchanger H1 is disposed between the outer periphery of the inner wall member 284 and the inner periphery of the inner cylindrical case 276.

The first stage heat exchanger H1 has a similar structure to that of the second stage heat exchangers H2; a large number of heat transfer tubes 285 wound in a coiled shape in one direction and a large number of heat transfer tubes 286 wound in a coiled shape in the other direction are disposed alternately so that parts thereof are meshed together, and these heat transfer tubes 285, 286 surround the outer periphery of the second stage heat exchanger H2. The upstream ends of the heat transfer tubes 285, 286 are connected to the first circular distribution passage 274, and the downstream ends thereof are connected to the second circular distribution passage 283.

The materials for the heat transfer tube 234 of the fifth stage heat exchanger H5, the heat transfer tube 235 of the fourth stage heat exchanger H4, the heat transfer tubes 256 to 259 of the third stage heat exchanger H3, the heat transfer tubes 262, 263 of the second stage heat exchanger H2, and the heat transfer tubes 285, 286 of the first stage heat exchanger H1 are preferably heat-resistant stainless steel (austenite type such as SUS 316L or SUS 310S, ferrite type such as SUS 430 or SUS 444) or a nickel-based heat-resistant alloy. Joining of the heat transfer tubes is preferably carried out by brazing, laser welding or mechanical restraint.

Furthermore, with regard to the metal supports 252 to 255 of the first stage metal catalytic system 264A to the fourth stage metal catalytic system 246D, heat-resistant stainless steel (e.g., 20% by weight Cr-5% by weight Al ferrite type stainless steel) or a nickel-based heat-resistant alloy metal foil (thickness 0.1 mm or below) is preferable.

As is clear from reference to FIG. 29, a water inlet 287, into which water that is a source of high pressure vapor is supplied, is provided in the first circular distribution passage 274, which communicates with the second circular distribution passage 283 via a large number of the heat transfer tubes 285, 286 of the first stage heat exchanger H1, and the second circular distribution passage 283 communicates with the third circular distribution passage 266 via a communicating passage 288. The third circular distribution passage 266 communicates with the fourth circular distribution passage 250 via the heat transfer tubes 262, 263 of the second stage heat exchanger H2, and the fourth circular distribution passage 250 communicates with four heat transfer tubes 256 to 259 of the third stage heat exchanger H3 via the first helical distribution passage 251. The four heat transfer tubes 256 to 259 of the third stage heat exchanger H3 communicate with a vapor outlet 289 via the second helical distribution passage 243, the heat transfer tube 235 of the fourth stage heat exchanger H4, and the heat transfer tube 234 of the fifth stage heat exchanger H5.

In this way, while the water that is supplied from the water inlet 287 travels to the vapor outlet 289 via the first stage heat exchanger H1→the second stage heat exchanger H2→the third stage heat exchanger H3→the fourth stage heat exchanger H4→the fifth stage heat exchanger H5, it exchanges heat with exhaust gas that comes out of the internal combustion engine E and flows in a direction opposite to that in which the water flows, the water becoming vapor.

That is, while passing through the uniform diameter part 218a of the exhaust port 218, the exhaust gas coming out of the internal combustion engine E exchanges heat with the fifth stage heat exchanger H5 formed from the heat transfer tube 234 wound around the outer periphery of the uniform diameter part 218a. The exhaust gas that has flowed from the uniform diameter part 218a of the exhaust port 218 into the increasing diameter part 218b exchanges heat by direct contact with the fourth stage heat exchanger H4 formed from the heat transfer tube 235 wound in a triple coil shape and housed within the increasing diameter part 218b. Harmful components are purified from the exhaust gas coming out of the exhaust port 218 while passing through the interiors of the first stage metal catalytic system 246A to the fourth stage metal catalytic system 246D and, at this point, the exhaust gas exchanges heat with the third stage heat exchanger H3 formed from the heat transfer tubes 256 to 259 arranged concentrically with the first stage to fourth stage metal catalytic systems 246A to 246D.

The exhaust gas that has passed through the first stage to fourth stage metal catalytic systems 246A to 246D and the third stage heat exchanger H3 is blocked by the end caps 267 and makes a U-turn, exchanges heat while flowing from the rear to the front through the second stage heat exchanger H2 formed from the heat transfer tubes 262, 263 disposed between the pair of cylindrical cases 260, 261, then changes direction through 180°, exchanges heat while flowing from the front to the rear through the first stage heat exchanger H1 formed from the heat transfer tubes 285, 286 disposed between the cylindrical case 276 and the inner wall member 284, and is finally discharged into the exhaust pipe 232 through the exhaust hole 272a of the distribution passage forming member 272.

The exhaust gas that has passed through the second stage heat exchanger H2 diffuses radially outward when passing through the helical opening 244 that communicates with the increasing diameter part 218b of the exhaust port 218, and is given a spiral flow by the guide vanes 245 attached to the interior of the helical opening 244. This makes the exhaust gas act uniformly over all of the first stage to fourth stage metal catalytic systems 246A to 246D and increases the residence time of the exhaust gas within the first stage to fourth stage metal catalytic systems 246A to 246D, thereby enhancing the exhaust gas purification effect. As shown in FIG. 25 in a magnified manner, since the phases of the corrugations of the metal supports 252 to 255 of each stage of the metal catalytic systems 246A to 246D are displaced by half a pitch from each other, a strong turbulent flow can be caused in the exhaust gas flow. This increases the residence time of the exhaust gas within the first stage to fourth stage metal catalytic systems 246A to 246D, thereby enhancing the exhaust gas purification effect and the heat exchange efficiency of the adjoining third stage heat exchanger H3.

Furthermore, the flow path lengths of the four heat transfer tubes 256 to 259 that include the flow path lengths of parts of the first and second helical distribution passages 251 and 243 can be made as uniform as possible by connecting the four heat transfer tubes 256 to 259 of the third stage heat exchanger H3 to optimal positions on the first helical distribution passage 251 and the second helical distribution passage 243; that is, connecting opposite ends of the heat transfer tube 256 that is radially outside and has a long pipe length to the outside, in the radial direction, of the first helical distribution passage 251 and the outside, in the radial direction, of the second helical distribution passage 243; and connecting opposite ends of the heat transfer tube 259 that is radially inside and has a short pipe length to the inside, in the radial direction, of the first helical distribution passage 251 and the inside, in the radial direction, of the second helical distribution passage 243, thereby reducing differences in pressure loss between the heat transfer tubes 256 and 259.

Moreover, since the first stage to fourth stage metal catalytic systems 246A to 246D and the third stage heat exchanger H3 are integrated so as to exchange heat with each other, the heat of reaction generated in the first stage to fourth stage metal catalytic systems 246A to 246D can be recovered by the third stage heat exchanger H3, thereby enhancing the thermal energy recovery effect and, furthermore, controlling the flow rate of water flowing through the third stage heat exchanger H3 thereby heats and activates the first stage to fourth stage metal catalytic systems 246A to 246D, or cools the first stage to fourth stage metal catalytic systems 246A to 246D, thereby enhancing the durability.

In addition, means for controlling the amount of water flowing through the third stage heat exchanger H3 may be provided by adding the 'multiple water supply' structure shown in FIGS. 11, 16, etc. of the first embodiment and, more particularly, by reference to FIG. 29, supplying water midstream at four positions in the water supply route from the first stage heat exchanger H1 to the fifth stage heat exchangers H5, that is, the third circular distribution passages 266 immediately upstream of the second stage heat exchangers H2, the fourth circular distribution passage 250 or the first helical distribution passage 251 immediately upstream of the third stage heat exchangers H3, and the second helical distribution passages 243 immediately upstream of the fourth stage heat exchangers H4, and individually controlling the amount of water supplied to the second stage to fourth stage heat exchangers H2, H3, H4 according to changes in the operational state (the flow rate of the exhaust gas or the temperature of the exhaust gas) of the internal combustion engine 1 and the catalyst temperature (this water supply method is called multiple water supply) can yet more finely control the catalyst temperatures of the first stage to fourth stage metal catalytic systems 246A to 246D at temperatures appropriate to the catalytic reaction.

The exhaust gas that has passed through the first stage to fourth stage metal catalytic systems 246A to 246D and the third stage heat exchanger H3 exchanges heat when passing through the first helical distribution passage 251, which is formed from a helical pipe material. Since this first helical distribution passage 251 diffuses the flow of the exhaust gas, heat spots can be prevented from occurring in the end cap 267 that is present to the rear of the passage 251 at the position where the exhaust gas turns back; the end cap 267, which is under thermally severe conditions, can be protected; and radiation of heat from the end cap 267 can be prevented. Moreover, since the first helical distribution passage 251, which is formed from the helical pipe material, has flexibility, differences in thermal expansion between the four heat transfer tubes 256 to 259 having different overall lengths can be absorbed.

Furthermore, since the exhaust gas flows from the internal combustion engine E side to the exhaust pipe 232 side, whereas water flows from the exhaust pipe 232 side to the internal combustion engine E side, the exhaust gas and the water are in a cross-flow state, and the difference in temperature between the exhaust gas and the water can therefore be maximized across all of the first stage to fifth stage heat exchangers H1 to H5, thereby contributing to an enhancement of the heat exchange efficiency between the exhaust gas and the water. Moreover, since the exhaust passage 233 is bent into a three stage zigzag shape and the first stage to third stage heat exchangers H1 to H3 are disposed in layers in the radial direction, the overall dimensions of the integrated evaporator type exhaust gas purification system C can be reduced as much as possible while minimizing the thermal leakage and preventing noise from being dissipated from the interior thereof, thereby providing a compact layout thereof in the cylinder head 212 of the internal combustion engine E.

Moreover, since the first stage to third stage heat exchangers H1 to H3 and the first stage to fourth stage metal catalytic systems 246A to 246D are arranged in a labyrinth form by disposing them in layers in the radial direction, not only can their silencing effect be effective in preventing exhaust noise from leaking outside the integrated evaporator type exhaust gas purification system C, but also an exhaust gas temperature lowering effect can be given, by mainly the first stage to fifth stage heat exchangers H1 to H5. This allows an exhaust muffler to be simplified or omitted, thereby making the exhaust system itself compact and lightweight. Furthermore, since the decrease in exhaust gas temperature causes the temperature of the exhaust passage to decrease, in particular, on the downstream side of the first stage heat exchanger H1, the degrees of freedom in designing with regard to heat resistance increase, and the use of a material such as a plastic for the exhaust passage becomes possible. As a result, with regard to the internal combustion engine E for a vehicle, the degrees of freedom in the shape of the exhaust passage, the degrees of freedom in mounting on the vehicle, the degrees of freedom in terms of cooling characteristics, etc. increase, and the degrees of freedom in the design of the entire vehicle, which has been subjected to restrictions by conventional exhaust systems, can be increased, thereby contributing to a reduction in the overall weight of the exhaust system.

Although embodiments of the present invention are explained in detail above, the present invention can be modified in a variety of ways without departing from the spirit and scope thereof.

For example, in the first embodiment, the internal combustion engine 1 for an automobile is illustrated as the combustion system, but the present invention can be applied to any other combustion system.

Industrial Applicability

As hereinbefore described, the combustion gas purification system related to the present invention can be applied to a case in which harmful components in the combustion gas from an internal combustion engine or any other combustion system are purified by an oxidation/reduction reaction. Furthermore, the internal combustion engine related to the present invention can be applied to one in which an exhaust gas purification system for purifying an exhaust gas and a heat exchanger for exchanging heat with the exhaust gas are provided in an exhaust passage.

What is claimed is:

1. A combustion gas purification system wherein a catalytic system that purifies a combustion gas is disposed in an exhaust passage guiding the combustion gas from a combustion system, and at least one part of the catalytic system is provided with temperature adjustment means for adjusting the temperature thereof, wherein the temperature adjustment means has a heat transfer tube through which an operating medium flows and the at least one part of the catalytic system has a catalyst support which is placed in direct contact and integrated with the heat transfer tube of the temperature adjustment means, and the heat transfer tube and the catalyst support are brought into direct contact with the combustion gas at a same position along a flow of the combustion gas, whereby the temperature adjustment means operates to recover thermal energy of the combustion gas and the operation of the temperature adjustment means depends on a temperature condition of the operating medium.

2. The combustion gas purification system according to claim 1, wherein the temperature adjustment means is a heat exchanger.

3. The combustion gas purification system according to claim 1, wherein the catalytic system provided with the temperature adjustment means is positioned on an upstream side of the exhaust passage.

4. The combustion gas purification system according to claim 1, wherein the temperature adjustment means also controls the temperature of a part of the catalytic system other than said one part of the catalytic system.

5. The combustion gas purification system according to claim 1, wherein temperature adjustment means for adjusting the temperature of the combustion gas is provided in the exhaust passage on an upstream side of the catalytic system.

6. The combustion gas purification system according to claim 5, wherein the temperature adjustment means for adjusting the temperature of the gas is a heat exchanger.

7. The combustion gas purification system according to claim 1, wherein the at least one part of the catalytic system is formed from a metal.

8. The combustion gas purification system according to claim 1, wherein a plurality of sheets of catalyst support are provided as said catalyst support and a plurality of heat transfer tubes are provided as said heat transfer tube.

9. The combustion gas purification system according to claim 1, wherein the operating medium of the temperature adjustment means flows in a passage and the combustion gas in the exhaust passage flows in a direction substantially opposite to that of a flow of the operating medium in the passage of the temperature adjustment means.

10. The internal combustion engine according to claim 1, wherein the temperature adjustment means is constructed to have a passage cross-sectional area that is large on an upstream side of the flow of combustion gas near the combustion system and small on a downstream side.

11. An internal combustion engine comprising in an exhaust passage, an exhaust gas purification system that purifies exhaust gas and a heat exchanger that exchanges heat with the exhaust gas, wherein the heat exchanger has a heat transfer tube through which an operating medium flows and at least one part of the exhaust gas purification system has an exhaust gas purifying element support which is placed in direct contact and integrated with the heat transfer tube of at least one part of the heat exchanger, and the heat transfer tube and the exhaust gas purifying element support are brought into direct contact with the exhaust gas at a same position along a flow of the exhaust gas so as to be able to exchange heat with each other, whereby the heat exchanger operates to recover thermal energy of the exhaust gas and the operation of the heat exchanger depends on a temperature condition of the operating medium.

12. The internal combustion engine according to claim 11, wherein stirring means for stirring the flow of the exhaust gas is provided on an upstream side of the section where the exhaust gas purification system and the heat exchanger are in contact.

13. The internal combustion engine according to claim 11, wherein the at least one part of the exhaust gas purification system is formed from a metal.

14. The internal combustion engine according to claim 11, wherein a plurality of corrugated metal supports are provided as said catalyst support and a plurality of heat transfer tubes are proved as said heat transfer tube.

15. The internal combustion engine according to claim 14, wherein the plurality of heat transfer tubes are concentric with and disposed alternately with the plurality of metal supports at a contact site.

16. The internal combustion engine according to claim 11, wherein the exhaust gas in the exhaust passage flows in a direction substantially opposite to that of a flow of the operating medium in the heat exchanger.

17. The internal combustion engine according to claim 11, wherein the heat exchanger is constructed to have a passage cross-sectional area that is large on an upstream side of the flow of the exhaust gas near a combustion chamber and small on a downstream side.

18. A combustion gas purification system wherein a catalytic system that purifies a combustion gas is disposed in an exhaust passage guiding the combustion gas from a combustion system, and at least one part of the catalytic system is provided with temperature adjustment means for adjusting the temperature thereof, wherein the temperature adjustment means uses an operating medium and the at least one part of the catalytic system is integrated with, the temperature adjustment means so that components of the temperature adjustment means surround components of the at least one part of the catalytic system at a contact site, whereby the temperature adjustment means operates to recover thermal energy of the combustion gas and the operation of the temperature adjustment mean depends on a temperature condition of the operating medium, wherein the components of the at least one catalytic system include a plurality of sheets of catalyst support and the components of the temperature adjustment means include a plurality of heat transfer tubes; and wherein the plurality of heat transfer tubes are formed in a zigzag shape and are interlaced with the plurality of sheets of catalyst support at the contact site.

* * * * *